United States Patent
Osman et al.

(10) Patent No.: US 10,120,438 B2
(45) Date of Patent: Nov. 6, 2018

(54) EYE GAZE TO ALTER DEVICE BEHAVIOR

(75) Inventors: Steven Osman, San Francisco, CA (US); Jeffrey Roger Stafford, Redwood City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 693 days.

(21) Appl. No.: 13/115,927

(22) Filed: May 25, 2011

(65) Prior Publication Data

US 2012/0300061 A1    Nov. 29, 2012

(51) Int. Cl.
| | | |
|---|---|---|
| *G06F 3/01* | (2006.01) | |
| *G06F 1/32* | (2006.01) | |
| *G06F 3/048* | (2013.01) | |
| *G06F 3/0484* | (2013.01) | |

(Continued)

(52) U.S. Cl.
CPC .............. *G06F 3/013* (2013.01); *G06F 1/325* (2013.01); *G06F 1/3231* (2013.01); *G06F 1/3265* (2013.01); *G06F 1/3287* (2013.01); *G06F 3/048* (2013.01); *G06F 3/04842* (2013.01); *B60K 35/00* (2013.01); *B60K 2350/1008* (2013.01);
(Continued)

(58) Field of Classification Search
CPC .............. H04N 5/232; H04N 1/00095; H04N 1/00212; H04N 1/00244; H04N 5/23203; H04N 5/23206; H04N 5/23216; H04N 5/23219; H04N 5/23222; H04N 1/00204; H04N 1/00209; H04N 1/2112; G05B 19/0426; G05B 2219/23026; G05B 2219/24162; G05B 2219/2613; G05B 2219/2615

USPC ........................................................ 348/135
See application file for complete search history.

(56) References Cited

U.S. PATENT DOCUMENTS

| | | |
|---|---|---|
| 5,588,139 A | 12/1996 | Lanier et al. |
| 5,950,202 A | 9/1999 | Durward et al. |
| 6,056,640 A | 5/2000 | Schaaij |

(Continued)

FOREIGN PATENT DOCUMENTS

| | | |
|---|---|---|
| CN | 101185080 A | 5/2008 |
| CN | 101208723 A | 6/2008 |

(Continued)

OTHER PUBLICATIONS

Adam Frucci, "Modded Nintendo Lets You Play Mario with Your Eyes Poorly" Aug. 3, 2010, Gizmodo, http://gizmodo.com/5603753/modded-nintendo-lets-you-play-mario- . . . .

(Continued)

*Primary Examiner* — Kehinde O Abimbola
(74) *Attorney, Agent, or Firm* — Martine Penilla Group, LLP

(57) ABSTRACT

Methods, devices, and computer programs for controlling behavior of an electronic device are presented. A method includes an operation for operating the electronic device in a first mode of operation, and an operation for tracking the gaze of a user interfacing with the electronic device. The electronic device is maintained in a first mode of operation as long as the gaze is directed towards a predetermined target. In another operation, when the gaze is not detected to be directed towards the predetermined target, the electronic device is operated in a second mode of operation, which is different from the first mode of operation.

15 Claims, 18 Drawing Sheets

(51) Int. Cl.
 *B60K 35/00* (2006.01)
 *H04N 5/76* (2006.01)
(52) U.S. Cl.
 CPC .............. *H04N 5/76* (2013.01); *Y02D 10/153* (2018.01); *Y02D 10/171* (2018.01); *Y02D 10/173* (2018.01)

(56) References Cited

U.S. PATENT DOCUMENTS

| | | | |
|---|---|---|---|
| 6,152,563 A | 11/2000 | Hutchinson et al. | |
| 6,204,828 B1 | 3/2001 | Amir et al. | |
| 6,281,877 B1 | 8/2001 | Fisher et al. | |
| 6,282,553 B1 | 8/2001 | Flickner et al. | |
| 6,345,111 B1 | 2/2002 | Yamaguchi et al. | |
| 6,522,312 B2 | 2/2003 | Ohshima et al. | |
| 6,859,144 B2 | 2/2005 | Newman et al. | |
| 6,943,754 B2* | 9/2005 | Aughey et al. | 345/8 |
| 7,094,153 B2* | 8/2006 | Kunieda et al. | 463/32 |
| 7,149,691 B2 | 12/2006 | Balan et al. | |
| 7,272,461 B2* | 9/2007 | Yoshikawa et al. | 700/111 |
| 7,306,337 B2* | 12/2007 | Ji | G06F 3/013 351/209 |
| 7,352,359 B2 | 4/2008 | Zalewski et al. | |
| 7,427,996 B2 | 9/2008 | Yonezawa et al. | |
| 7,532,197 B2* | 5/2009 | Clement | A61B 3/113 345/156 |
| 7,627,139 B2 | 12/2009 | Marks et al. | |
| 7,671,916 B2 | 3/2010 | Hashimoto | |
| 7,714,895 B2 | 5/2010 | Pretlove et al. | |
| 7,843,429 B2 | 11/2010 | Pryor | |
| 7,928,977 B2 | 4/2011 | Tanimura et al. | |
| 8,253,649 B2 | 8/2012 | Imai et al. | |
| 8,323,106 B2 | 12/2012 | Zalewski | |
| 8,537,113 B2 | 9/2013 | Weising et al. | |
| 8,913,004 B1* | 12/2014 | Bozarth | G06K 9/00604 345/156 |
| 8,922,480 B1* | 12/2014 | Freed et al. | 345/156 |
| 8,957,847 B1* | 2/2015 | Karakotsios | G06F 3/013 345/156 |
| 2002/0039073 A1* | 4/2002 | Ben-Ari et al. | 340/980 |
| 2002/0128063 A1* | 9/2002 | Kunieda et al. | 463/31 |
| 2003/0062675 A1 | 4/2003 | Noro et al. | |
| 2003/0156144 A1 | 8/2003 | Morit | |
| 2004/0061831 A1* | 4/2004 | Aughey et al. | 351/209 |
| 2004/0174496 A1* | 9/2004 | Ji | G06F 3/013 351/209 |
| 2005/0270368 A1 | 12/2005 | Hashimoto | |
| 2006/0007396 A1* | 1/2006 | Clement | G06F 3/013 351/209 |
| 2006/0033713 A1 | 2/2006 | Pryor | |
| 2006/0066567 A1* | 3/2006 | Scharenbroch | G02B 27/01 345/156 |
| 2006/0105838 A1 | 5/2006 | Mullen | |
| 2006/0112334 A1 | 5/2006 | Endrikhovski et al. | |
| 2006/0181538 A1* | 8/2006 | Kim | G06F 3/14 345/502 |
| 2006/0192775 A1 | 8/2006 | Nicholson et al. | |
| 2006/0223635 A1 | 10/2006 | Rosenberg | |
| 2006/0238877 A1* | 10/2006 | Ashkenazi et al. | 359/630 |
| 2006/0250498 A1* | 11/2006 | Yoshikawa et al. | 348/77 |
| 2006/0253799 A1 | 11/2006 | Montroy et al. | |
| 2006/0256083 A1 | 11/2006 | Rosenberg | |
| 2006/0258420 A1 | 11/2006 | Mullen | |
| 2006/0290663 A1 | 12/2006 | Mitchell | |
| 2007/0008338 A1* | 1/2007 | Kim | G09G 5/003 345/629 |
| 2007/0027591 A1 | 2/2007 | Goldenberg et al. | |
| 2007/0190494 A1 | 8/2007 | Rosenberg | |
| 2007/0206017 A1 | 9/2007 | Johnson et al. | |
| 2007/0207857 A1 | 9/2007 | Angell et al. | |
| 2007/0265089 A1 | 11/2007 | Robarts et al. | |
| 2008/0048931 A1* | 2/2008 | Ben-Ari | 345/8 |
| 2008/0111833 A1 | 5/2008 | Thorn et al. | 345/690 |
| 2008/0122796 A1 | 5/2008 | Jobs et al. | |
| 2008/0136775 A1 | 6/2008 | Conant | |
| 2008/0211766 A1 | 9/2008 | Westerman et al. | |
| 2008/0228422 A1 | 9/2008 | Sato | |
| 2008/0261693 A1 | 10/2008 | Zalewski | |
| 2008/0297586 A1* | 12/2008 | Kurtz et al. | 348/14.08 |
| 2008/0297587 A1* | 12/2008 | Kurtz et al. | 348/14.08 |
| 2008/0297588 A1* | 12/2008 | Kurtz et al. | 348/14.08 |
| 2008/0297589 A1* | 12/2008 | Kurtz et al. | 348/14.16 |
| 2008/0298571 A1* | 12/2008 | Kurtz | H04N 7/142 379/156 |
| 2009/0022368 A1* | 1/2009 | Matsuoka et al. | 382/103 |
| 2009/0110245 A1* | 4/2009 | Thorn | 382/118 |
| 2009/0128552 A1 | 5/2009 | Fujiki et al. | |
| 2009/0146953 A1 | 6/2009 | Lou et al. | |
| 2009/0189974 A1 | 7/2009 | Deering | |
| 2009/0221374 A1 | 9/2009 | Yen et al. | |
| 2009/0244097 A1 | 10/2009 | Estevez | |
| 2009/0245600 A1* | 10/2009 | Hoffman et al. | 382/128 |
| 2009/0248036 A1* | 10/2009 | Hoffman et al. | 606/130 |
| 2009/0262074 A1 | 10/2009 | Nasiri et al. | |
| 2009/0282102 A1 | 11/2009 | Geurts et al. | |
| 2009/0303204 A1 | 12/2009 | Nasiri et al. | |
| 2009/0315869 A1 | 12/2009 | Sugihara et al. | |
| 2010/0007582 A1 | 1/2010 | Zalewski | |
| 2010/0020102 A1 | 1/2010 | Vaananen et al. | |
| 2010/0053151 A1 | 3/2010 | Marti et al. | |
| 2010/0060441 A1* | 3/2010 | Iwamoto | B60W 50/14 340/435 |
| 2010/0121501 A1 | 5/2010 | Neugebauer et al. | |
| 2010/0156781 A1 | 6/2010 | Fahn | |
| 2010/0165093 A1* | 7/2010 | Sugio et al. | 348/78 |
| 2010/0182232 A1* | 7/2010 | Zamoyski | 345/157 |
| 2010/0238262 A1* | 9/2010 | Kurtz et al. | 348/14.01 |
| 2010/0245532 A1* | 9/2010 | Kurtz et al. | 348/14.03 |
| 2010/0287485 A1 | 11/2010 | Bertolami et al. | |
| 2010/0315413 A1 | 12/2010 | Izadi et al. | |
| 2011/0022950 A1 | 1/2011 | Dallago | |
| 2011/0161890 A1 | 6/2011 | Anderson et al. | |
| 2011/0175932 A1 | 7/2011 | Yu et al. | |
| 2011/0195763 A1 | 8/2011 | Kang et al. | |
| 2011/0211056 A1* | 9/2011 | Publicover et al. | 348/78 |
| 2011/0298829 A1 | 12/2011 | Stafford et al. | |
| 2011/0320978 A1 | 12/2011 | Horodezky et al. | |
| 2012/0029302 A1 | 2/2012 | Hsu et al. | |
| 2012/0188148 A1 | 7/2012 | Dejong | |
| 2012/0236143 A1* | 9/2012 | Weatherhead | 348/135 |
| 2012/0314060 A1* | 12/2012 | Hubenthal et al. | 348/135 |
| 2015/0169053 A1* | 6/2015 | Bozarth | G06K 9/00604 345/156 |
| 2015/0177834 A1* | 6/2015 | Karakotsios | G06F 3/013 345/156 |

FOREIGN PATENT DOCUMENTS

| | | |
|---|---|---|
| DE | 102005003535 A1 | 3/2006 |
| DE | 10 2005 03535 A1 | 8/2006 |
| DE | 102005003535 A1 | 8/2006 |
| DE | 102009034069 A1 | 5/2010 |
| EP | 0718823 A2 | 6/1996 |
| GB | 2440348 A | 1/2008 |
| JP | 10240389 A | 9/1998 |
| JP | 2000138872 A | 5/2000 |
| JP | 2000278626 A | 10/2000 |
| JP | 2005063296 A | 3/2005 |
| JP | 2006119408 A | 5/2005 |
| JP | 2005279896 A | 10/2005 |
| JP | 2008292753 A | 10/2005 |
| JP | 2008014904 A | 1/2008 |
| JP | 2009267644 A | 11/2009 |
| JP | 2010204785 A | 9/2010 |
| TW | 200630865 A | 9/2006 |
| WO | 2004012141 A3 | 5/2004 |
| WO | WO 2007092512 A2 | 8/2007 |
| WO | 2008103988 A3 | 10/2008 |

(56) References Cited

OTHER PUBLICATIONS

Alice Oh, et al., "Evaluating Look-to-Talk: A Gaze-Aware Interface in a Collaborative Environment", CHI '02 Extended Abstracts on Human Factors in Computing System, CHI 2002, Jan. 1, 2002 (Jan. 1, 2002), p. 650.

Renaud Blanch et al., "Semantic Pointing: Improving Target Acquisition With Control-Display Ratio Adaption", CHI 2004: [CHI Conference Proceedings. Human Factors in Computing Systems], Vienna, Austria, Apr. 29, 2004 (Apr. 29, 2004), pp. 519-526.

TOBII and Lenovo show off prototype eye-controlled laptop, we go eyes-on; http://www.engadget.com/2011/03/01/tobii-and-lenovo-show-off-prototype-eye-controlled-laptop-we-go/.

Stafford et al.; U.S. Appl. No. 13/045,414; Title "Selecting View Orientation in Portable Device via Image Analysis"; filed Mar. 10, 2011.

Senju et al.; "Is anyone looking at me? Direct gaze detection in children with and without autism"; Brain and Cognition 67 (2008) 127-139.

Perez et al.; "A Precise Eye-Gaze Detection and Tracking System"; WSCG '2003, Feb. 3-7, 2003 Plezn, Czech Republic.

Magee et al.; "EyeKeys: A Real-time Vision Interface Based on Gaze Detection form a Low-grade Video Camera"; Computer Science Department, Boston University, Boston MA.

Kaminski et al.; "Head Orientation and Gaze Detection From a Single Image"; 2006.

Guestrin et al.; "General Theory of Remote Gaze Estimation Using the Pupil Center and Corneal Reflections"; IEEE Transactions on Biomedical Engineering, vol. 53, No. 6, Jun. 2006.

PCT International Search Report and Written Opinion of the ISA/EP issued in the International Application No. PCT/US2012/0322613, European Property Office, dated Oct. 31, 2013.

Deodhar et al.; " Eye Catchers: A System for Eye Gaze Detection Using the TI C6416 DSP"; Advanced DSP Laboratory, May 7, 2010.

Notice of Reason(s) for Refusal dated Mar. 10, 2015.

Abstracts of Japanese references.

Notice of Reason(s) for Refusal.

First Office Action issued by the Chinese Patent Office dated Oct. 9, 2015.

* cited by examiner

EYE GAZE TO ALTER DEVICE BEHAVIOR

BACKGROUND

1. Field of the Invention

The present invention relates to methods for controlling the behavior of electronic devices, and more particularly, methods and systems for controlling device behavior based on the gaze of one or more users.

2. Description of the Related Art

Electronic devices are becoming more and more pervasive in everyday life. The feature sets keep growing, offering a wider variety of functions and options for users. As the number of options grows, ease of use becomes more and more important as users try to select and navigate through all the options offered by electronic devices. At times, some of the options are not even available due to the current environmental variables of the device, yet a user may still be presented with a complex tree of menu options. For example, an option in a Global Positioning System (GPS) device allows a user to select between voice navigation assistance (verbal instructions for the driver of a car) or directions on a map shown in a display situated near the driver. However, a user driving on a curvy road at night may have difficulties following a map since the user must focus attention on the road ahead.

Advances in the science of gaze detection allow devices to determine if one or more users and presently looking at a certain target. To improve the usability and configurability of electronic devices, better user interfaces are needed to take into account the state of the device as well as the user situation in order to produce intuitive, easy-to-use interfaces, which improve interactions between man and machine.

It is in this context that embodiments of the invention arise.

SUMMARY

Embodiments of the present invention provide methods and systems for controlling behavior of an electronic device based on user-gaze direction. It should be appreciated that the present invention can be implemented in numerous ways, such as a process, an apparatus, a system, a device or a method on a computer readable medium. Several inventive embodiments of the present invention are described below.

In one embodiment, a method includes an operation for operating the electronic device in a first mode of operation, and an operation for tracking the gaze of a user interfacing with the electronic device. The electronic device is maintained in a first mode of operation as long as the gaze is directed towards a predetermined target. In another operation, the system detects that the gaze is not directed towards the predetermined target. The electronic device is operated in a second mode of operation, different from the first mode of operation, after detecting that the gaze is not directed towards the predetermined target.

In another embodiment, an electronic device includes a gaze detection module and a processor. The gaze detection module determines if the gaze of the user interfacing with the electronic device is directed towards a predetermined target. The processor supports different modes of operation for the electronic device, the modes of operation including a first mode and a second mode of operation. While the gaze of the user is directed towards the predetermined target the processor operates in the first mode of operation, and the processor operates in the second mode of operation after the gaze detection module detects that the gaze of the user is not directed towards the predetermined target.

In yet another embodiment, a computer program embedded in a non-transitory computer-readable storage medium, when executed by one or more processors, for controlling behavior of an electronic device, includes program instructions. Included in the medium are program instructions for operating the electronic device in a first mode of operation, and program instructions for tracking a gaze of a user interfacing with the electronic device. Further, the medium also includes program instructions for maintaining the electronic device in a first mode of operation as long as the gaze is directed towards a predetermined target, and program instructions for detecting that the gaze is not directed towards the predetermined target. Additional program instructions enable the operation of the electronic device in a second mode of operation different from the first mode of operation, after detecting that the gaze is not directed towards the predetermined target.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments describe methods, computer programs, and apparatus for controlling the behavior of an electronic device utilizing user-gaze information. It will be obvious, however, to one skilled in the art, that the present invention may be practiced without some or all of these specific details. In other instances, well known process operations have not been described in detail in order not to unnecessarily obscure the present invention.

Figure 1A:
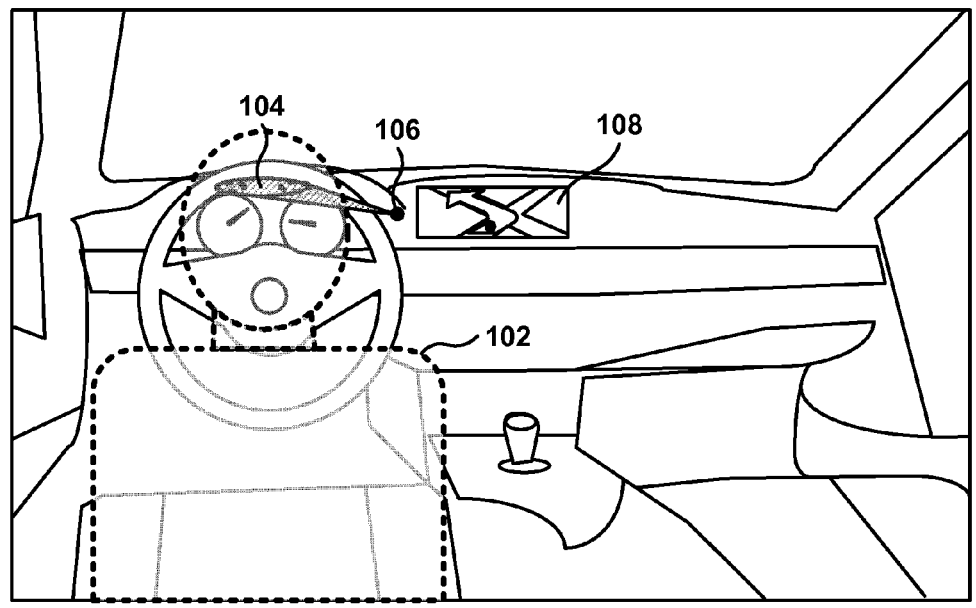
FIGS. 1A to 1C illustrate a navigation system that changes mode of operation based on the gaze of the user, according to one embodiment.
Figure 1B:
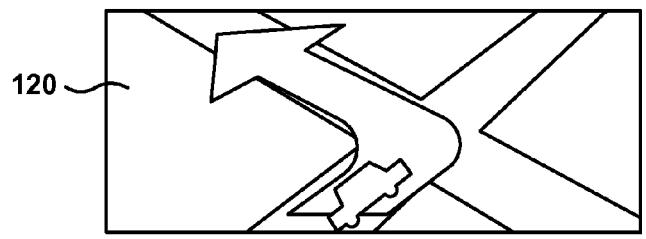
Figure 1C:
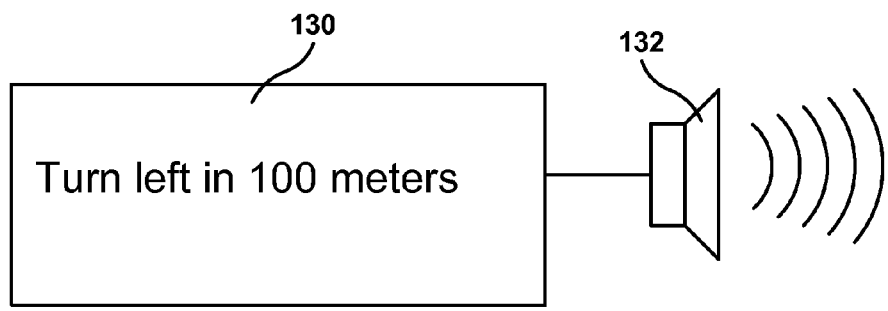

FIGS. 1A to 1C illustrate a navigation system that changes mode of operation based on the gaze of the user, according to one embodiment. A user's gaze is good indicator of the user's attention or intention. Using eye-gaze information as input enables a computer system to gain contextual information about the user's task, which in turn can be leveraged to design interfaces that are more intuitive and intelligent. With the increasing accuracy and decreasing cost of eye-gaze tracking systems, eye-gaze tracking can be used in a wide range of applications.

Eye tracking, or eye-gaze tracking, is the process of measuring either the point of gaze ("where a user is looking"), or the motion of an eye relative to the head. An eye tracker is a device for measuring eye position and eye movement. There are a number of methods for measuring eye movement and gaze direction. Some methods use video images from which the eye position is extracted, and other methods use search coils or are based on the electrooculogram. In another method, infrared light is emitted by a device with an infrared camera or detector, or that is in communication with an infrared camera or detector. The infrared light is reflected from the user's retinas back onto the infrared camera or detector. The amount of infrared light reflected back is based on the person's gaze towards the emitter. A user's gaze on a device is determined once the infrared light received on the camera or detector reaches a certain threshold for a period of time. Small lapses in gaze are considered blinks of the eye and are ignored.

Using eye-gaze detection, a device—e.g., a portable entertainment device, an in-vehicle navigation system, a child's toy, a TV, etc.—can change its behavior based on how much attention is receiving from the user. In some embodiments, a device only needs to know if a user is looking at the device, but the device does not need to know the precise direction of a user's gaze. In other embodiments, the precise direction of the user's gaze is considered to control the behavior of the device. Embodiments of the invention enable consumer electronic devices to take advantage of gaze detection, and to tailor functionality based on the attention received by the electronic device. By utilizing gaze detection, devices can provide more intuitive interaction and an improved experience for the user.

In the embodiment shown in FIG. 1A, a gaze detection system is used to determine if driver 102 is looking at display 108, which includes a car navigation system. The gaze detection system includes camera 106 that captures video of the eyes 104 of the driver 102. The gaze detection system, which includes camera 106 and display 108, determines if the gaze of driver 102 is directed towards the display. The system changes behavior according to the gaze—when the gaze is directed towards the display, the car navigation system displays a map to assist the driver to reach a destination, and when the gaze is not directed to the display, the car navigation system provides audible directions to the user.

FIG. 1B illustrates the mode of operation that includes showing map 120 when the user is looking at the display. The example of FIG. 1B shows a location of the car in the map and an indication, the arrow, of the next turn to be taken by the driver. Additional information on the display can include distance to the next intersection, distance to destination, street names, etc.

FIG. 1C illustrates the mode of operation when the driver is not looking at the map, e.g., the driver is looking at the road ahead. Speaker 132 delivers verbal cues to the driver, such as "turn left in 50 meters," "turn right at the next intersection," "drive on highway 17 for the next 10 miles," etc. Display 130 can be dimmed or turned off, or can present the verbal cues as visual cues. Visual cues are not required (the visual cues on the display may be available for other people in the car). In another embodiment, the map is always shown on the display and the verbal cues are only provided when the gaze of the user is not on the display.

The change of behavior can be utilized in a variety of devices and scenarios. For example, a television can pause the show being displayed (the television system is connected to a Digital Video Recorder) when gaze fades away. Other examples of devices changing behavior based on user gaze are given below with reference to FIGS. 2A to 11B.

Figure 2A:
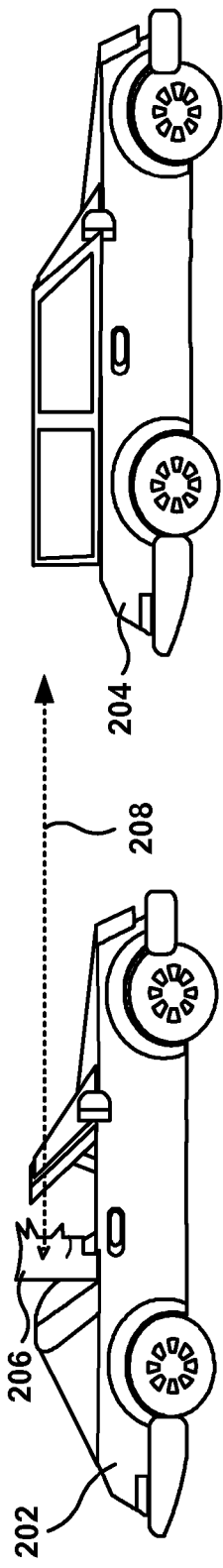
FIGS. 2A and 2B illustrate a collision avoidance system using gaze detection, according to one embodiment.
Figure 2B:
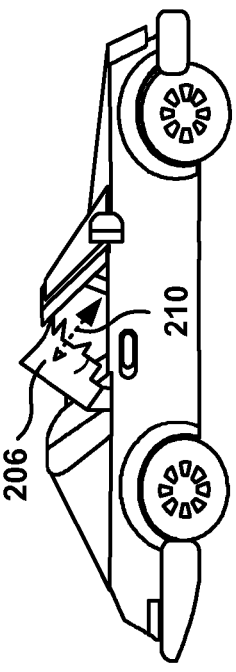

FIGS. 2A and 2B illustrate a collision avoidance system using gaze detection, according to one embodiment. User interfaces change modality, depending on whether the user is paying attention to a device or to a situation. For example, in the scenario illustrated in FIG. 2A, a potential alarm situation arises when car 204 suddenly slows down in front of car 202, which is detected by a car proximity detector. If user 206 is looking ahead (as detected by a gaze detector, such as the one shown in FIG. 1A), then no alarm is generated because the user is already looking at the car in front. However, if user 206 is not looking ahead, as shown in FIG. 2B, then the car proximity detector will generate an alarm, which can be audible, visible, or both. In another embodiment, a threshold of danger is defined to determine when a collision is imminent, and when the collision is imminent, the alarm is generated regardless of whether user 206 is looking ahead or not. The threshold condition is calculated base one or more factors, such as the distance between the cars, the speed of the cars, the relative speed of the cars, an average response time for a user, a configuration parameter indicating when the user whishes to receive an alarm, etc.

In another embodiment, an alert condition is generated when a user is changing lanes and the user is not looking at a car approaching in the destination lane for the lane change. The alarm is avoided if the user is looking at a mirror where the other car can be seen, or if the user has turned the head in the direction of the second car. More than one gaze detector may be needed to detect if the user is looking at the mirror or the side of the car.

Figure 3:
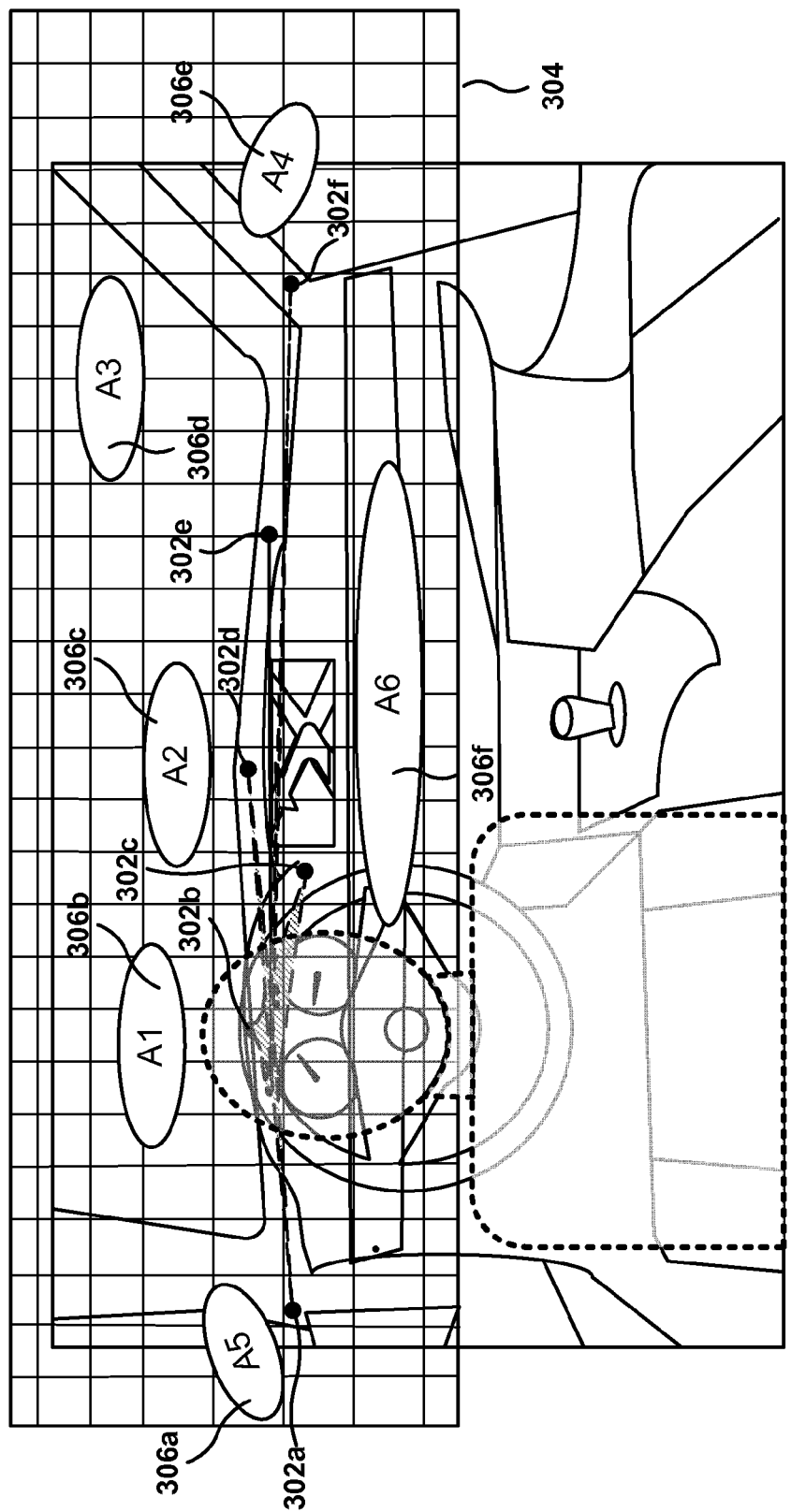
FIG. 3 illustrates an embodiment of a gaze detection system with multiple gaze detection units.

FIG. 3 illustrates an embodiment of a gaze detection system with multiple gaze detection units. The car of FIG.

3 includes several gaze detection units 302a-302f. Each gaze detection unit detects if the user is looking at the corresponding target for that gaze detection unit. The information from all the gaze detection units is combined to define a grid 304. The grid coordinates of the approximate point or area where the user is looking are calculated based on the information from gaze detection units 302a-302f.

Further, different target areas A1-A6 (306a-306f) are defined in order to determine when alarms are generated. One or more specific target areas are utilized according to the situation. For example, if a user is changing to the lane on the right and a car is in the lane on the right, the collision detection system will generate an alarm if the user is not looking at target area A4 306e, and will not generate an alarm if the user is looking at target area A4 306e. In the same scenario as the one illustrated in FIGS. 2A and 2B, an alarm will be generated if the user is looking at target A3 306d when there is a potential collision with the car in front. The single gaze detector of FIG. 2A may have detected that the user was looking ahead, but the single gaze detector may have not detected that the user was looking to the side (A3), because the user may have been looking at a street sign, a car on the next lane, a commercial banner, a pedestrian, etc. Thus, the additional resolution added by having multiple gaze detectors improves the ability to determine danger situations. In addition, the increased resolution may limit the number of alarms generated because there is a better understanding of where the user is directing their sight.

Figure 4A:
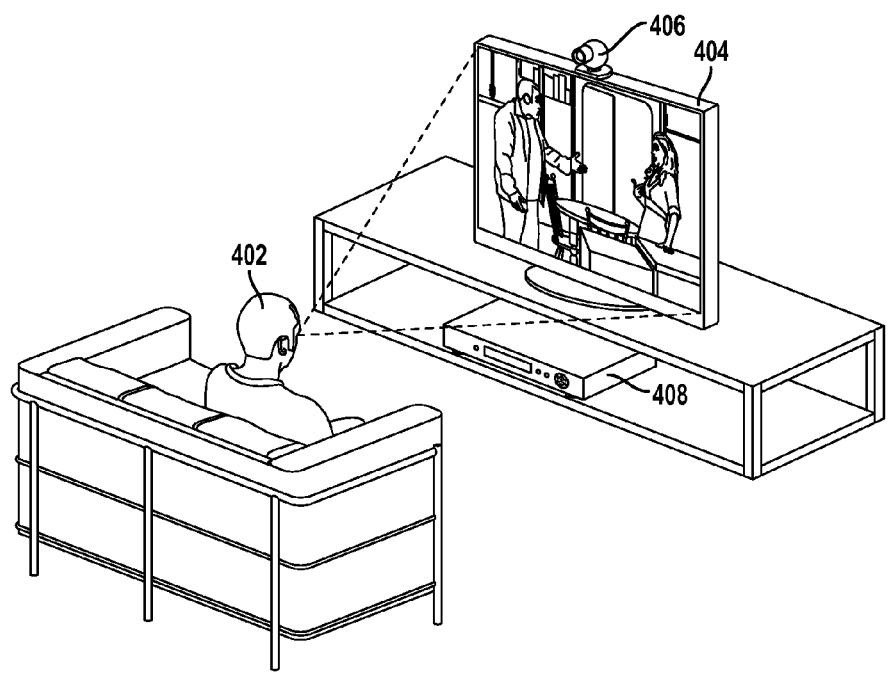
FIGS. 4A and 4B show a video recorder activated when a user looks away from a display, according to one embodiment.
Figure 4B:
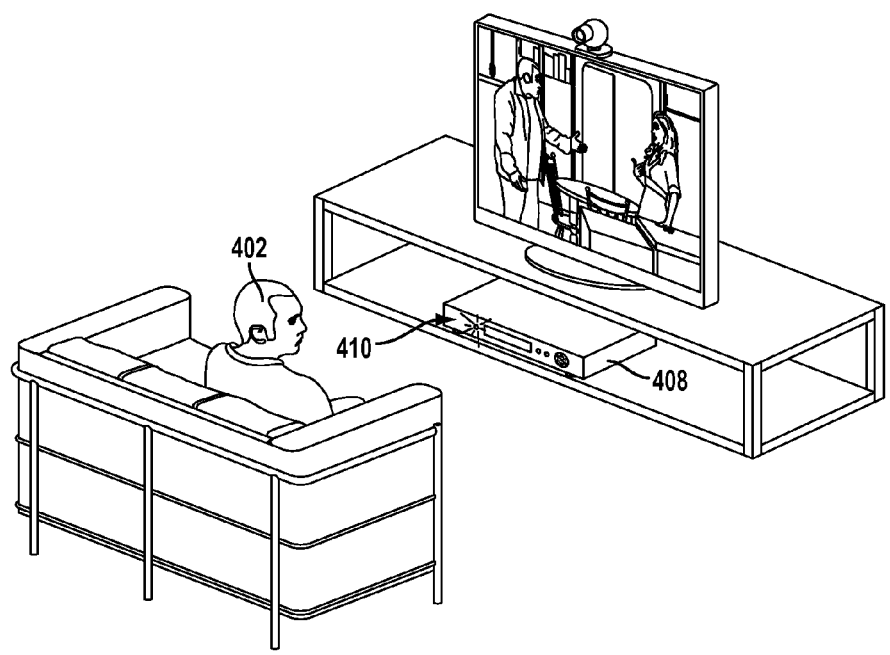

FIGS. 4A and 4B show a video recorder activated when a user looks away from a display, according to one embodiment. As shown in FIG. 4A, user 402 is watching a television show on display 404. A gaze detection system uses camera 406 aimed at the user to detect when the user is looking to the display or away from the display. When the gaze detection system determines that user 402 is looking at display 404, Digital Video Recorder (DVR) 408 does not record the television show. However, when user 402 looks away from display 402, as shown in FIG. 4B, the gaze detection system takes action.

In one embodiment, DVR 408 starts recording the show (light 410 turned on indicates that the DVR is recording) so the user can watch the show at a later time. In another embodiment, the DVR records the show and the show is paused until the user turns back their gaze towards display 404. The ability to record only when the user is looking away is useful when the recording capacity of the DVR is limited.

The same principle is used in other applications using a display, such as pausing a video game when the user looks away, pausing a streaming internet video, pausing a DVR that is playing a movie, pausing a computer game or some other software application, etc.

In yet another embodiment, a television set decreases the volume when gaze is not detected on the television, and increases the volume when gaze is detected. In another embodiment, gaze detection determines the quality of recording. For example, when the user is looking at the display, the recording is made with low quality because it is assumed that the user will not watch the show again. However, if the user looks away, the recording switches to high resolution mode because the system assumes that the user will watch, at a future time, the part of the show he missed.

If there are several viewers in the room, one embodiment determines if any of the users is looking at the display before taking action, such as starting recording or pausing the show. In another embodiment, a testing application or a web-based classroom use gaze detection to determine when the user is paying attention. If the user is not paying attention, a flag may be shown to a teacher, or the software application will not give the user credit for paying attention.

Figure 5A:
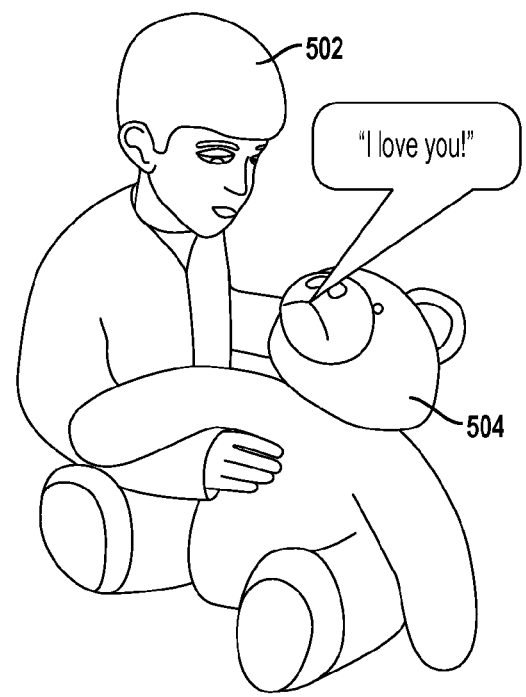
FIGS. 5A and 5B depict a toy that changes behavior depending on the gaze of the child, according to one embodiment.
Figure 5B:
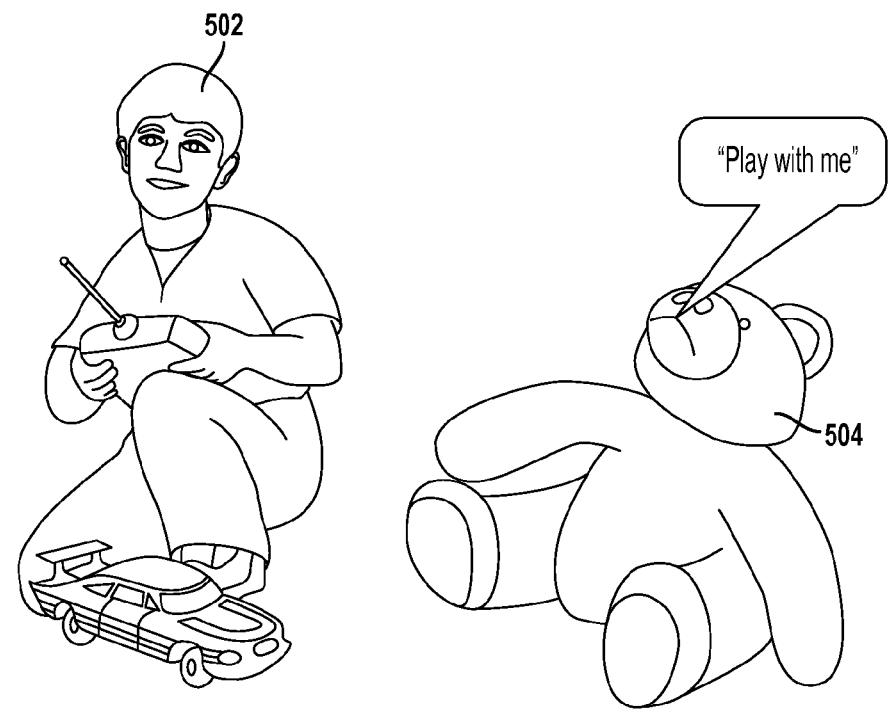

FIGS. 5A and 5B depict a toy that changes behavior depending on the gaze of the child, according to one embodiment. FIG. 5A shows child 502 playing with toy 504, which includes a gaze detection system. When toy 504 detects that the child's gaze is set on the toy, toy 504 interacts with child 502 by emitting sounds, producing verbal messages, moving around, flashing lights, etc.

When child 502 is not looking at toy 504, as illustrated in FIG. 5B, toy 504 responds by trying to induce the child to play with the toy, and eventually, after a predetermined period, by shutting down. For example, the toy may emit a verbal message ("Play with me"), or flash some lights, sound a siren, move closer to the child, etc. Thus, the behavior of the toy changes according to the gaze of the child.

Figure 6A:
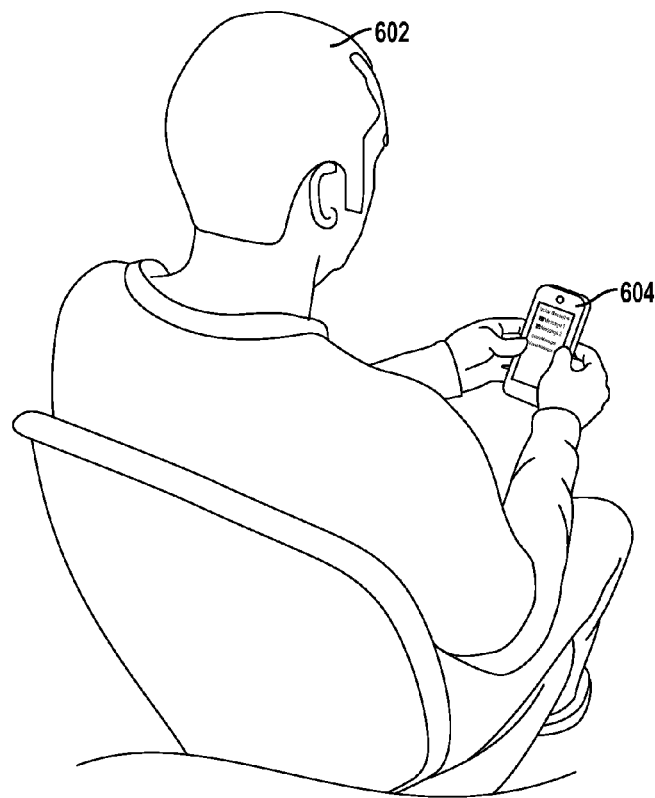
FIGS. 6A and 6B illustrate an embodiment of a mobile phone that changes behavior depending on the user's gaze on the phone.
Figure 6B:
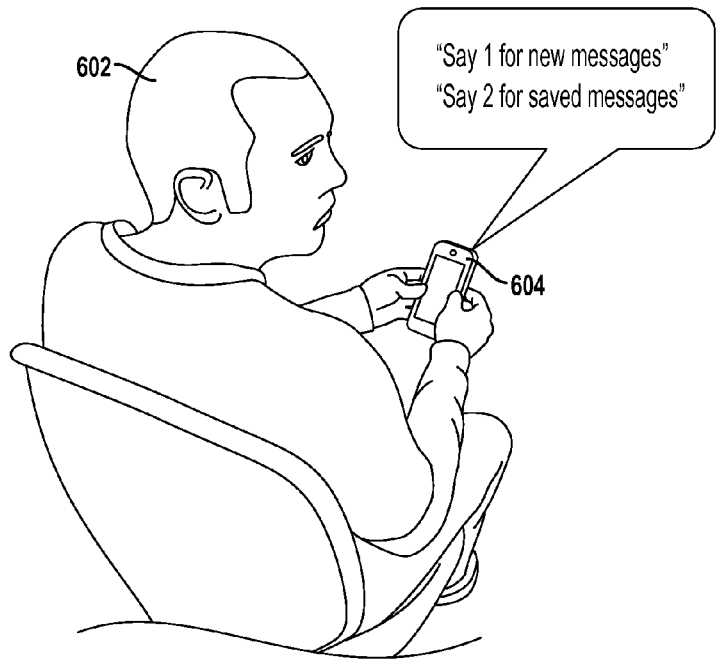

FIGS. 6A and 6B illustrate an embodiment of a mobile phone that changes behavior depending on the user's gaze on the phone. As shown in FIG. 6A, mobile phone 604 includes at least two behavior modes for obtaining voice mail, a visual mode and an audible mode. Mobile phone 604 has a gaze detection system that includes a camera facing the user, and the behavior of the voice mail application changes according to the gaze of user 602. When user 602 is looking at mobile phone 604 (FIG. 6A), the mobile phones operates using a visual voice mail interface, which includes one or more of a list of voice mails, command buttons (play, rewind, replay, save, next, etc.), data voice mail received, etc.

When user 602 looks away from mobile phone 604, the voice mail application switches to audible voice mail mode, as shown in FIG. 6B. The audible voice mail mode provides prompts to user 602 to guide user 602 through the different options. The user in return provides voice commands to mobile phone 604 to select the desired options. In one embodiment, the user can provide other types of inputs, such as pushing a button, touching a touchscreen, etc. For example, user 602 may be given a list of choices to say a number corresponding to an option, and the user selects one of the options by saying the corresponding number.

In another embodiment, the gaze of the user changes the power consumption mode of an electronic device. For example, when the user looks away from the device, the device may enter power-saving mode to decrease the amount of power supplied to input devices, such as buttons, touch panels, cameras, etc.

Figure 7A:
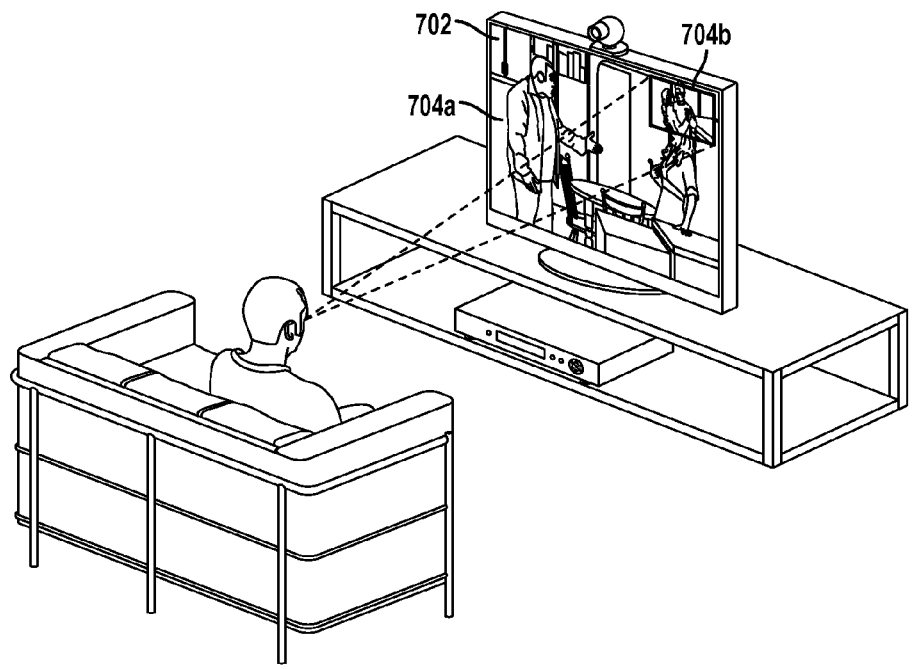
FIGS. 7A and 7B illustrate the behavior of a picture-in-picture display that changes according to user gaze, in accordance in one embodiment.
Figure 7B:
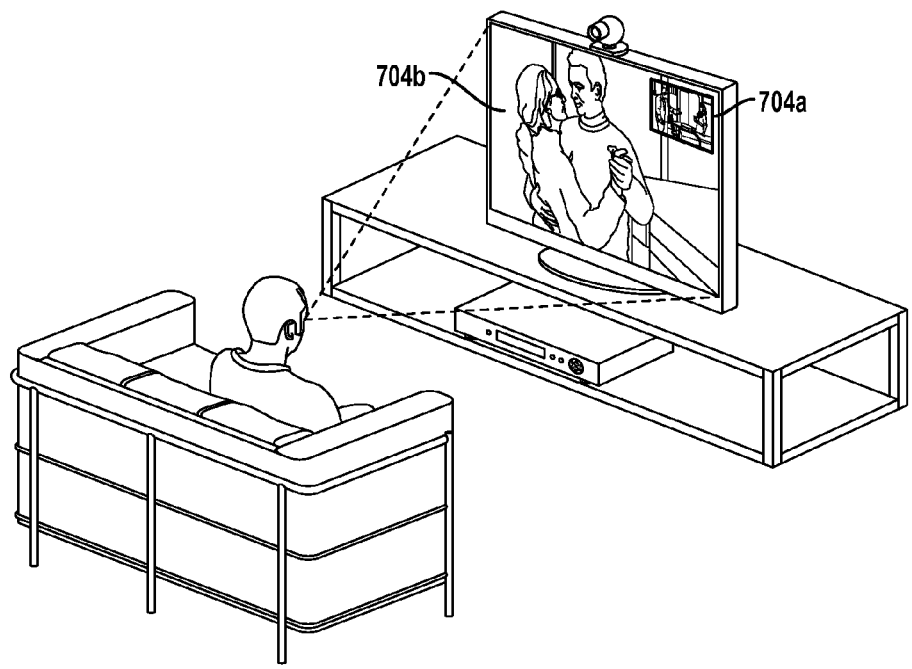

FIGS. 7A and 7B illustrate the behavior of a picture-in-picture (PIP) display that changes according to user gaze, in accordance in one embodiment. Display 702 includes a gaze detection system that is, not only able to detect if the user is looking at display 702, but also able to detect if the user is looking at a particular section of display 702. FIG. 7A shows display 702 presenting a first video 704a in the main section of the display, and a second video 704b in an inset within the display, which is known as the picture-in-picture window.

When the gaze detection system determines that the user is looking at video 704b in the picture-in-picture window, for an amount of time exceeding a threshold, the gaze detection system switches the showing of the first video and the second video. As shown in FIG. 7B, the first video 704a is displayed in the picture-in-picture window and the second video 704b is displayed in the main area of display 702.

FIGS. 7A and 7B illustrate how the operating mode of the display changes without requiring user input, and without producing a notification to the user (e.g., an alarm) that the operating mode is changing. The gaze system triggers a change in the operating mode of the electronic device, without requiring an action or an input from the user, beyond that of changing the gaze direction. Thus, the change of operating mode is independent of user action. In another example, a computer program detects if the gaze of the user remains, for a period of time (e.g., 2 seconds), on one of several advertisements shown on a web page. When the gaze of the user remains on the advertisement, then the computer program performs an action related to the advertisement, such as opening a related web page, running an animation, increasing the size of the advertisement to provide additional information to the user, etc.

In one embodiment, a notification is provided to the user indicating that the mode of operation is being changed, but permission from the user is not required to change the mode of operation. For example, a brief message is shown on the display indicating that the videos are being switched (e.g., "Switching program with picture-in-picture program"). However, the user still produces no active input (beyond changing the gaze, of course) to command the television to switch the programs.

In yet another embodiment, gaze detection is combined with user input. Once the gaze detection system determines that the gaze of the user has changed, the user is prompted for an input to determine if the electronic device will change operating mode. For example, when the gaze detection systems detects that the gaze of the user is on the picture-in-picture display, the television asks the user for permission to switch the programs (e.g., "Do you want to switch with PIP? Press 1 to switch, press 2 to cancel"). In the example described above with reference to web page advertising, instead of giving additional information automatically, the computer program asks the user if the user whishes additional information for the advertised product or service. If the user accepts the suggestion, then additional information is provided.

Figure 8:
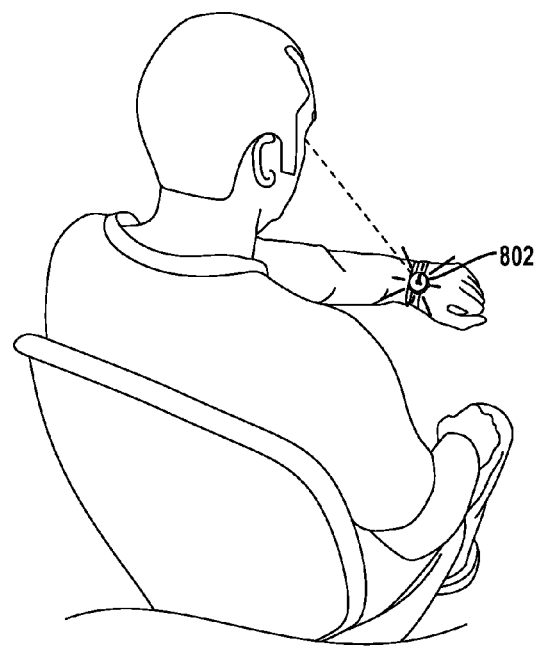
FIG. 8 depicts a watch that glows brighter when the watch detects the user's gaze, according to one embodiment.

FIG. 8 depicts a watch that glows brighter when the watch detects the user's gaze, according to one embodiment. Watch 802 has a gaze detection system, and when the gaze detection system detects that user is looking at the watch, then the watch improves the visibility of the watch. For example, the watch may turn on a light that brightens up the watch, or increase the amount of power to the display to make the display brighter, turn on a glow mechanism, turn on the display, etc.

The watch saves power because the visibility is only enhanced when the user is looking at the watch. The embodiment in FIG. 8 is exemplary and not meant to be limiting. The same principle can be used in other devices such as a television set, a television remote controller, a game console, a game controller, a keyboard, an alarm control panel, an electronic book reader, instrumentation in the dashboard of a car, etc. Devices can change the power mode consumption, such as waking up a television or a phone from a standby mode when the gaze is detected on the device.

In another embodiment, power consumption also takes into account other parameters that are combined with the status of the gaze detection. For example, instrumentation on the dashboard of a car may not increase the light emitted, when the user is looking at the instrumentation, if the system detects that it is daylight and the dashboard is sufficiently illuminated by natural light.

Figure 9:
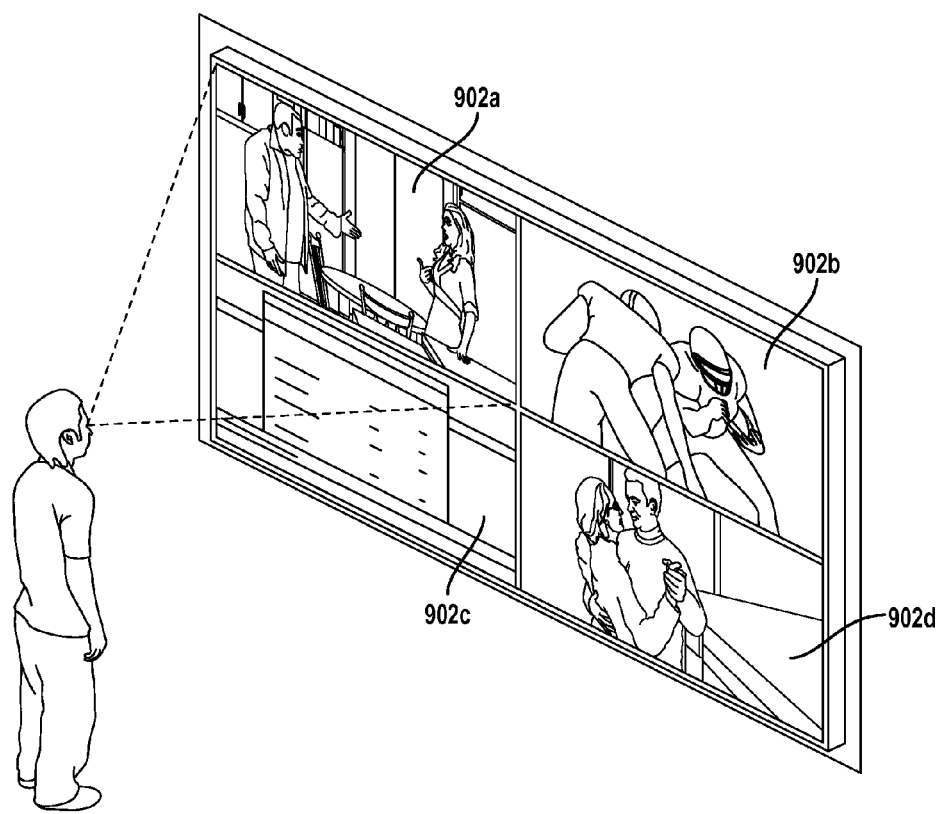
FIG. 9 illustrates a device that enhances the visibility of an area of the display based on the user's gaze, according to one embodiment.

FIG. 9 illustrates a device that enhances the visibility of an area of the display based on the user's gaze, according to one embodiment. A large display is divided into separate areas, each area showing a different video. In the example of FIG. 9, the display is divided into four areas, 902a to 902d. When the gaze detection system determines that a user is looking at one of the areas, such as area 902a, the system changes the properties of the video being watched. In other embodiment, the areas not being watched that have the videos shown, can change properties too. For example, when the system detects that the user is looking at area 902a, the system increases the quality of the video shown in area 902a by improving the resolution (e.g. reducing video compression), by providing a higher resource bandwidth to area 902a, or by adding resources to the watched area. More Central Processing Unit (CPU) resources can be added to the video of area 902a to improve the rendering of the video or higher power is given to the display elements (e.g. LEDs) of area 902a. The rest of the areas can be shown at a lower resolution, but a good enough resolution so the user can change focus to another area and see what is being displayed.

For example, the area being watched is shown at one resolution and the areas not being watched are shown at a different resolution. In one embodiment, the system can track more than one user, such as when a second user is watching a different area from the area watched by the first user. In this case, the region watched by the second user is also shown with higher resolution. In another embodiment, when the gaze detection system determines that a user is looking at one of the areas, such as area 902a, the system plays the audio associated with the video playing in the area being observed by the user. Accordingly, the audio from the areas not being observed (902b, 902d, and 902c) will be muted. If the user changes the gaze to another area (e.g., area 902b), then the audio from the previous area (e.g., 902a) will be muted, and the audio associated with the new area (e.g., 902b) will be played.

In yet another embodiment, a visual cue is provided to the user indicating which area is being selected with gaze. For example, an icon can be displayed on the selected area, the area selected is framed with a border having a predefined pattern or color, a light (e.g., and LED) is turned on in the frame of the display next to the selected area, etc.

Figure 10A:
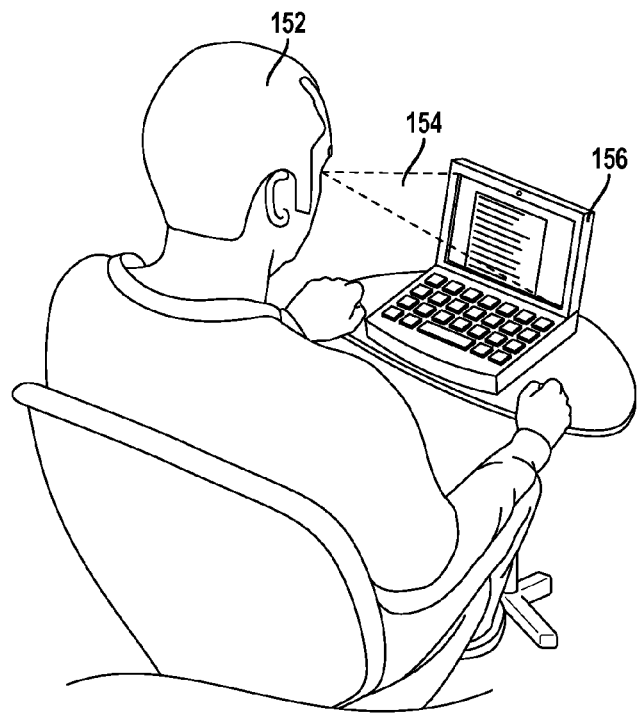
FIGS. 10A and 10B illustrate the operation of a screensaver based on user gaze, according to one embodiment.
Figure 10B:
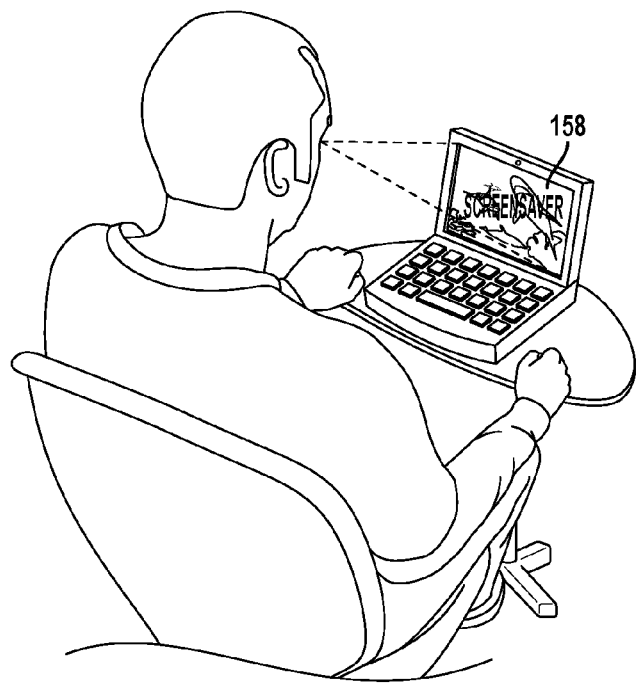

FIGS. 10A and 10B illustrate the operation of a screensaver based on user gaze, according to one embodiment. A screensaver is a type of computer program, initially designed to prevent burn-in on computer monitors, that blanks the screen or fills the screen with moving images, when the computer is not in use. The screensaver is typically started after a period of inactivity of input devices, such as keyboard and mouse. The screensaver terminates after receiving a message from the operating system, indicating that the mouse has been moved or a key has been pressed.

While user 152 reads a document on display 156, the user may take a long time to read the same page. If the user exceeds the screensaver inactivity time trigger, screensaver 158 will start executing (as shown in FIG. 10B) and the user is not able to continue reading. However, a gaze detection 154 system incorporated into the computer enhances the screensaver's behavior.

The gaze detection system in the computer blocks the computer system from starting the screensaver while the gaze of the user is on the display. If the gaze of the user is not on the display, the computer starts the screensaver as soon as gaze on the computer is not detected. In another embodiment, the moment the gaze is not detected on the display, the computer starts the inactivity timer, and when the timer expires the screensaver is started. If the user returns their gaze to the display while the screensaver is executing, then the screensaver is terminated. The inactivity timer is reset if the screensaver is not executing.

Gaze detection for controlling screensavers can also be utilized in other devices that include a display, such as a book reader, a tablet, a mobile phone, a video-game player, etc.

Figure 11A:
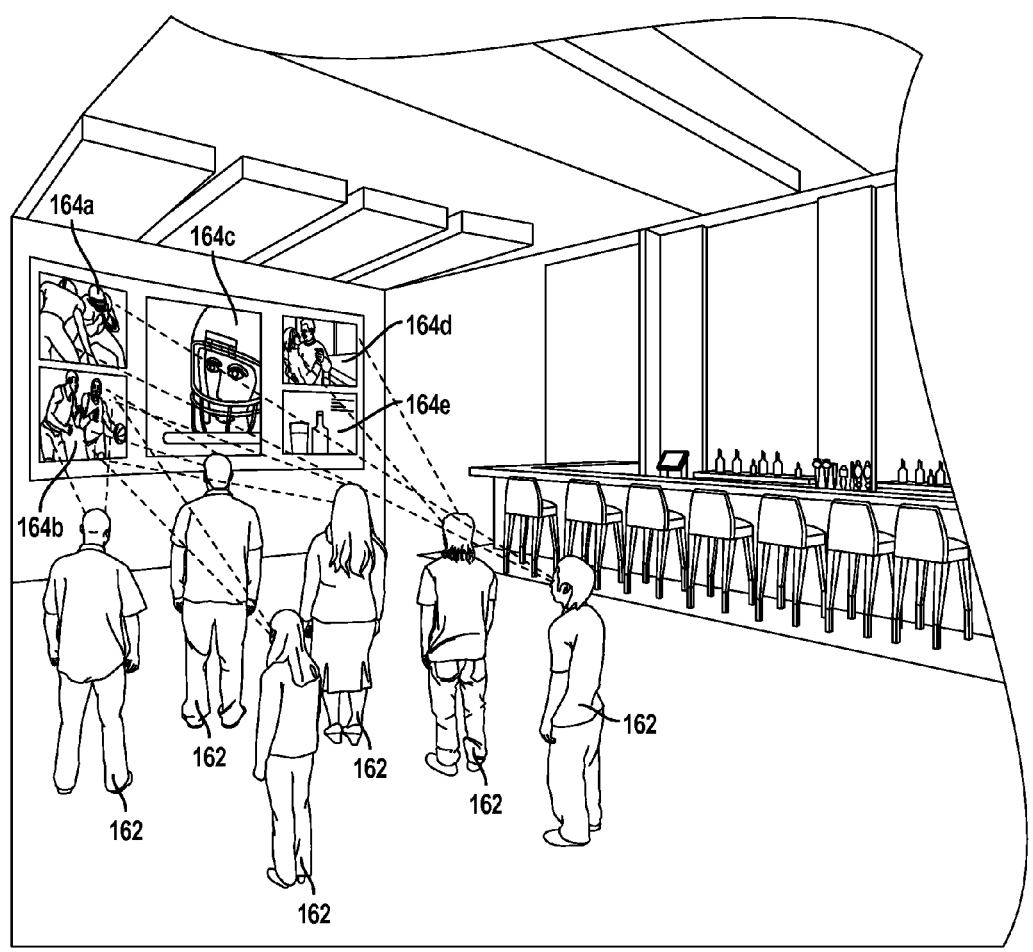
FIGS. 11A and 11B illustrate a system that responds to the direction of the gaze of several users, in accordance with one embodiment.
Figure 11B:
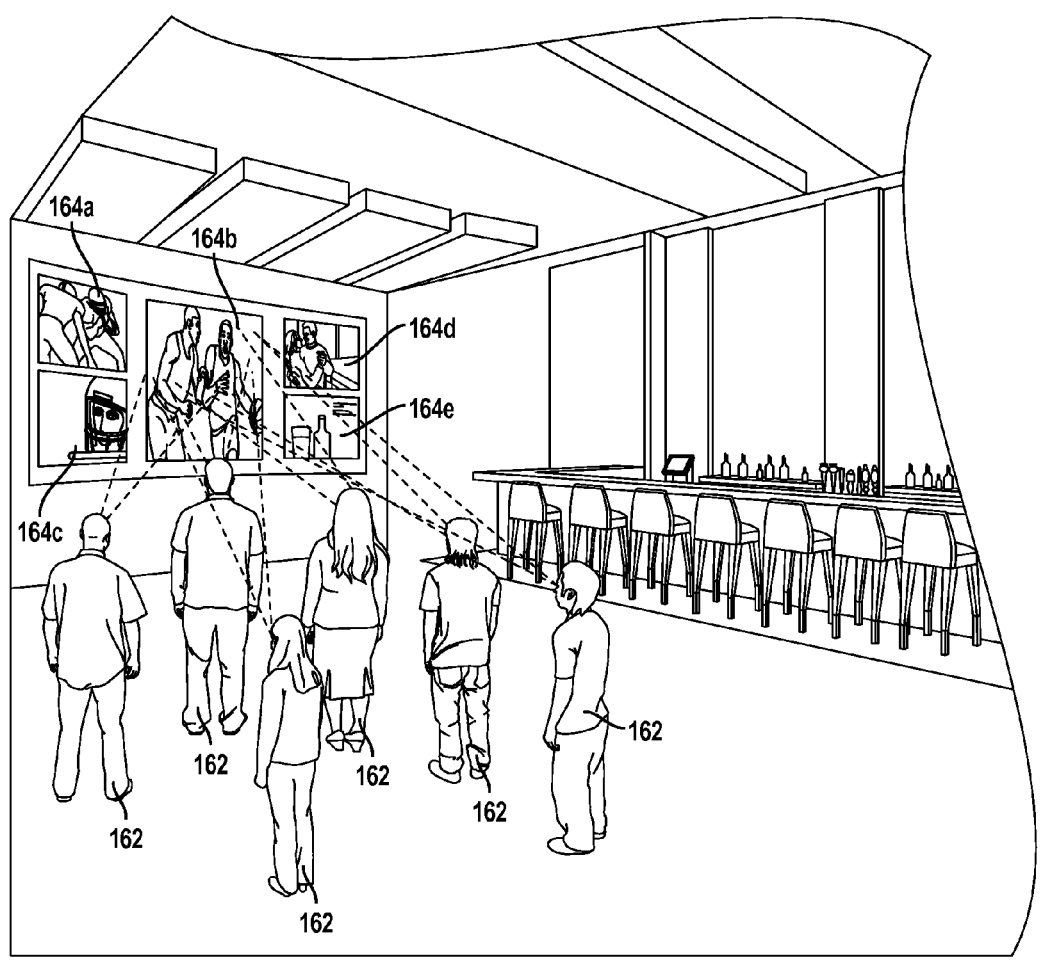

FIGS. 11A and 11B illustrate a system that responds to the direction of the gaze of several users, in accordance with one embodiment. The embodiments of FIGS. 11A and 11B include a gaze detection system that tracks the gaze from more than one viewer. A plurality of viewers 162 in a bar watch screens displaying different videos or programs 164a-164e, where each of the videos and programs can be switched to be displayed in a different screen. There is a central screen, larger than the other screens, showing program 164c, and the system aims at displaying on the central screen the most popular program. To determine the most popular program, the gaze detection system determines which programs the viewers 162 are watching. The program that has the most viewers is determined to be the most popular.

In the embodiment of FIG. 11A, program 164b is the most popular with the viewers because there are three viewers watching program 164b, and all the other programs have less than three viewers. Since the program on screen 164b is the most popular, the system switches programs 164c and 164b, such that program 164b is shown on the central screen, as shown in FIG. 11B. For example, several sports events are being watched at the bar. At a moment in time, a goal is scored in one of the games presented in a small screen, causing many of the patrons to shift their attention to the game with the goal scored. The gaze detection system detects that this program, where the goal was scored, is the most popular program, and the system then switches the popular program to the central screen.

In one embodiment, a screen not watched by any viewer for a certain amount of time changes the video or program shown, not by switching with other screen, but by changing the feed, such as by changing the television channel.

In another embodiment, the data collected on the programs that the viewers are watching is combined with data from other locations to obtain data for a large group of individuals. The combined data is used for several purposes, such as to assess the viewing patterns of the large group, to determine the popularity of commercials, to calculate program ratings, etc. This aggregated data can also be used for marketing purposes, such as by listing on real time the popularity of programs, listing the most popular programs, adjusting advertising rates so companies pay more for advertising in popular programs, etc.

In one embodiment, the system creates a dynamic channel that displays the most popular program at a given time, or that displays the most popular program from a list of channels configured by the user. For example, a user may have selected two different sporting events, and the program shown will vary according to the dynamically-calculated popularity of the sporting events. The popularity changes when exciting events happen in the sporting events, such as a score, a penalty, etc.

The data collected regarding gaze-based viewer's video choices is used, in another embodiment, to determine the popularity of segments within a show. Thus, future viewers can access rating information indicating which segments of the show acquired higher ratings, where each segment is given an individual rating, independent of the ratings of other segments within the show. A stream of content ratings is created, whereby a show is not just rated by a unique show rating, but rather the show is rated at each segment (e.g., hour, minute, second, chapter, inning, half, quarter, set, game, etc.) based on gaze voting.

In another embodiment, an electronic device redirects CPU resources away from the processing of Graphical User Interface (GUI) tasks to other tasks when there is no gaze detected on the display. When the gaze returns to the display, GUI processing receives additional CPU resources to ensure that the GUI is responsive to the user. In yet another embodiment, an alarm clock is turned off or set to snooze when the alarm clock detects a gaze for a sustained period of time.

Figure 12:
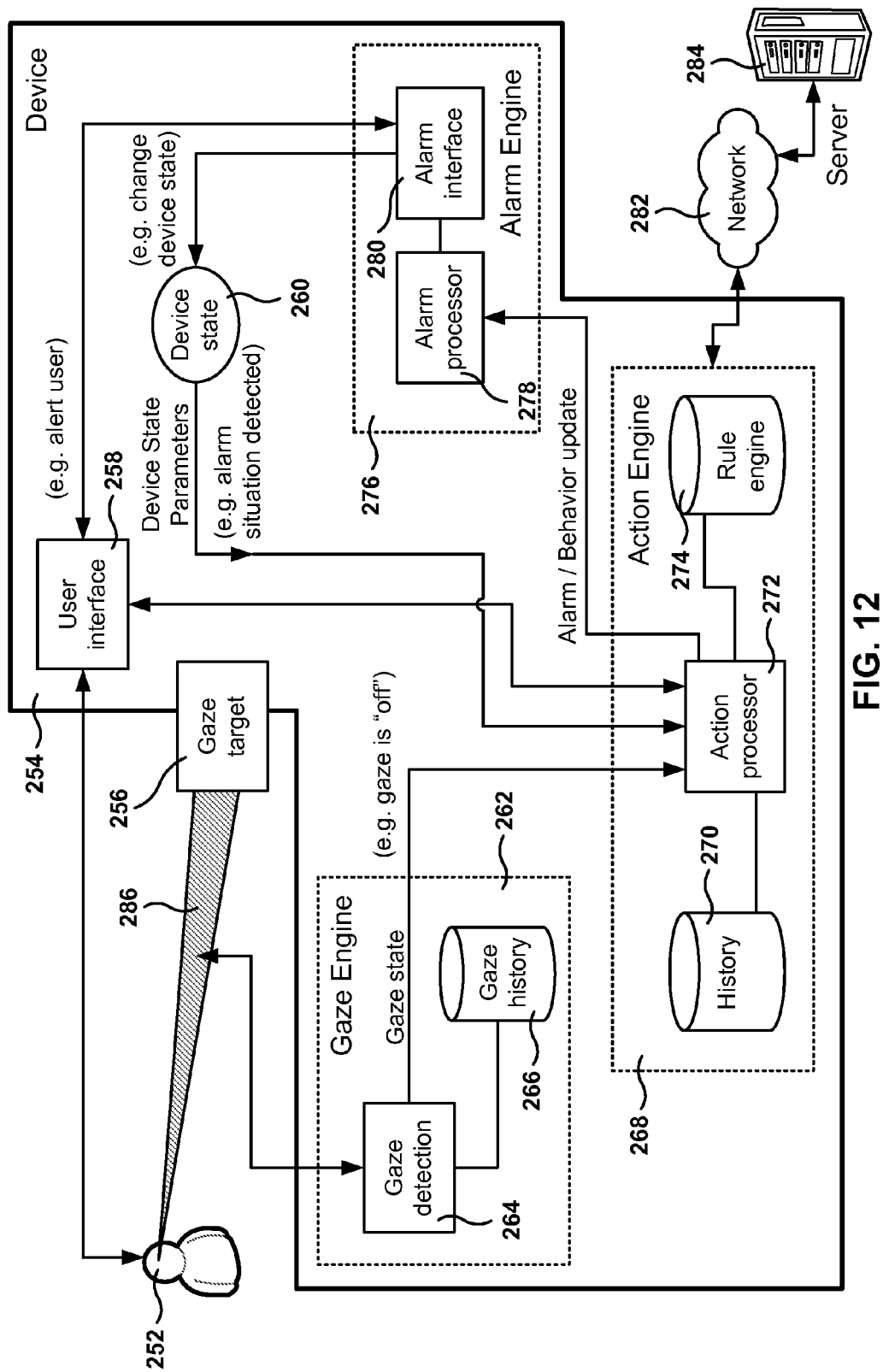
FIG. 12 depicts the architecture of a gaze detection system, according to one embodiment.

FIG. 12 depicts the architecture of a gaze detection system, according to one embodiment. Device 254 includes a gaze detection system that includes at least a gaze engine 262, an action engine 268, and an alarm engine 276. The gaze detection system determines, at any moment in time, if user 252 has their gaze 286 on gaze target 256. The gaze target can be the complete device, or a part of the device, such as a video display. In another embodiment, described below with reference to FIG. 13, the gaze target is not situated on the device.

Gaze engine 262 includes gaze detection module 264 and gaze history database 266. Gaze detection module 264 determines if the gaze of user 252 is on gaze target 256. In one embodiment, gaze detection module 264 includes a camera facing user 252 together with gaze detection software that analyzes the eyes of user 252. However, other gaze detection systems are also possible. One skilled in the art will appreciate that the embodiment of FIG. 12 is exemplary and not meant to be limiting. In one embodiment, a history of the gaze status (on or off) is kept in database 266. The gaze history can be used in embodiments that take into account the history of the gaze, such as for example, a screensaver application described above with reference to FIGS. 10A and 10B.

Action engine 268 includes action processor 272, history database 270, and rule engine 274. The action processor 272 takes inputs related to gaze information, and determines which action to take in response to the status of the gaze of the user. The inputs to action processor 272 include gaze state from gaze detection 264, device state 260, user interface 258, etc. Action processor 272 also interfaces with alarm engine 276 to command the alarm engine 276 to generate alarms, or to initiate some other action to be performed by the device. History database 270 includes a history of the different actions taken by action processor 272, such as a log of alarm events.

Action processor 272 uses logic rules to determine the actions to be generated. The rules are stored in rule engine database 274 and are configurable by the user or other programs, inside and outside the device. In one embodiment, server 284 interfaces with device 254 via network 282 to configure action engine 268. For example, one rule may be "generate a two-second loud beep when user's car is less than 1 second away from a collision with car ahead, and user's gaze is not directed towards the front of the car." Another rule may be "in a navigation system, use verbal directions when user is not looking at display, and use map navigation when user is looking at the display."

Alarm engine 276 includes alarm processor 278 and alarm interface 280. The alarm processor receives commands from action processor 272 and translates the commands into specific actions in the device, which are communicated via alarm interface 280. Device state 260 of device 254 includes the values of parameters associated with the status of the device, and more specifically, the values of parameters related to gaze detection and actions associated therewith. Alarm interface 280 can change the device state 260 (e.g., dim the display) and the device state parameters are also available to the action processor 272. User interface 258 provides one or more interfaces to different elements in device 254, such as display, keyboard, mouse, car instrumentation, camera, speaker, etc.

Figure 13:
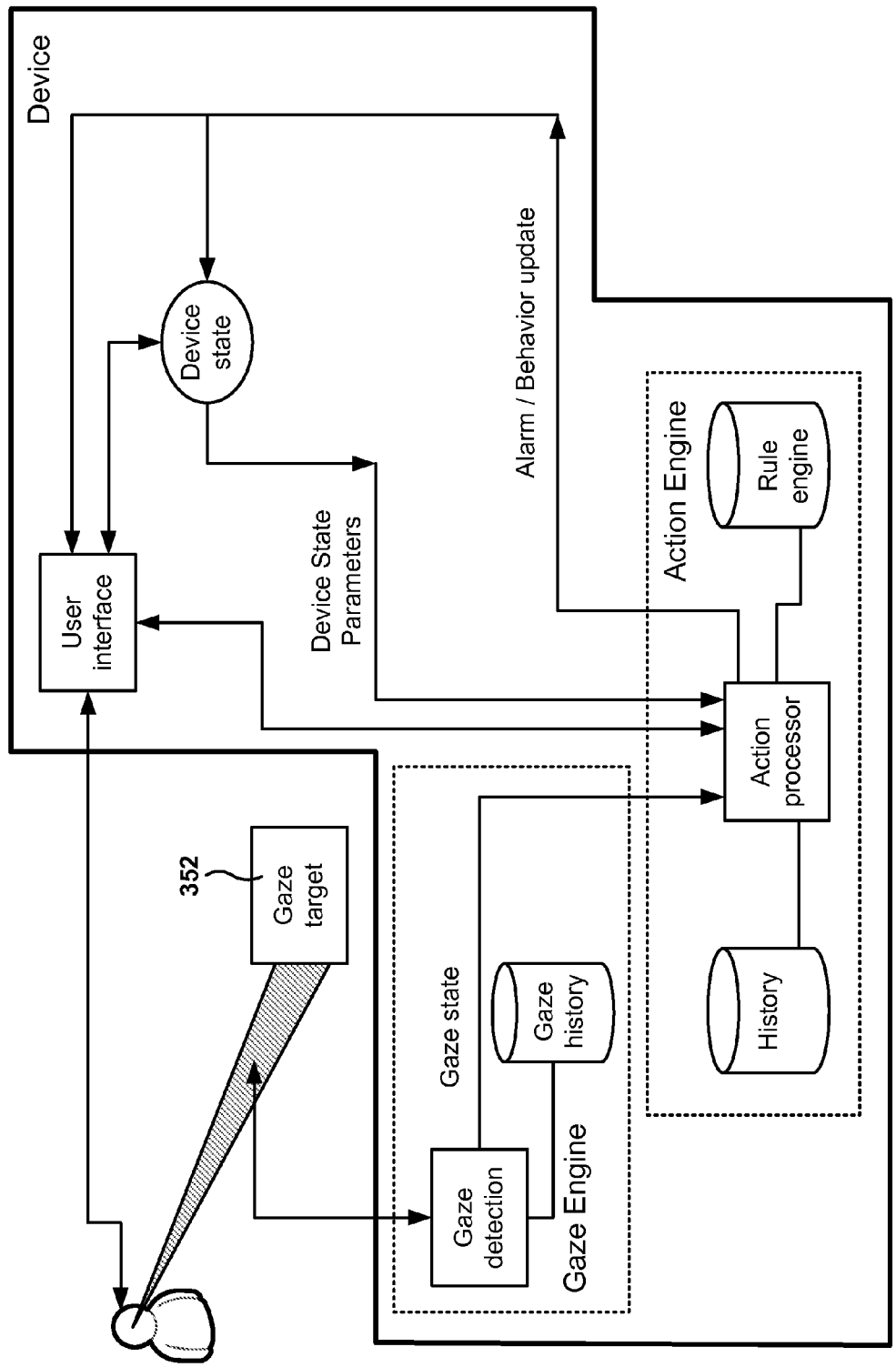
FIG. 13 depicts another embodiment of a gaze detection system where the gaze target is located outside the electronic device.

FIG. 13 depicts another embodiment of a gaze detection system where the gaze target is located outside the electronic device. Gaze target 352 is not part of the device interfacing with the user. In one embodiment, a car collision-detection system does not check if the user is looking at the collision-detection system, but rather checks if the user is looking at the car ahead when the user is dangerously approaching the car ahead. Thus, the gaze target is not in the gaze detection system or in the device holding the gaze detection system.

Generally speaking, the state of a first environmental parameter is tracked (e.g., a car ahead, bandwidth available), analysis is made to see if a condition occurs that requires response (e.g., water boiling over, car breaking ahead), and a determination is made based on the state of the gaze of a user or users.

In yet another embodiment, the gaze engine is located outside the device and interfaces with the device. The gaze target is external to both the gaze engine and the device. The three components (gaze engine, gaze target, and device) interface with each other to detect gaze and have the device react to the gaze of the user.

It should be noted that the embodiments illustrated in FIGS. 12 and 13 are exemplary. Other embodiments may utilize different modules, or some modules may not be present. The embodiments illustrated herein should therefore not be interpreted to be exclusive or limiting, but rather exemplary or illustrative.

Figure 14A:
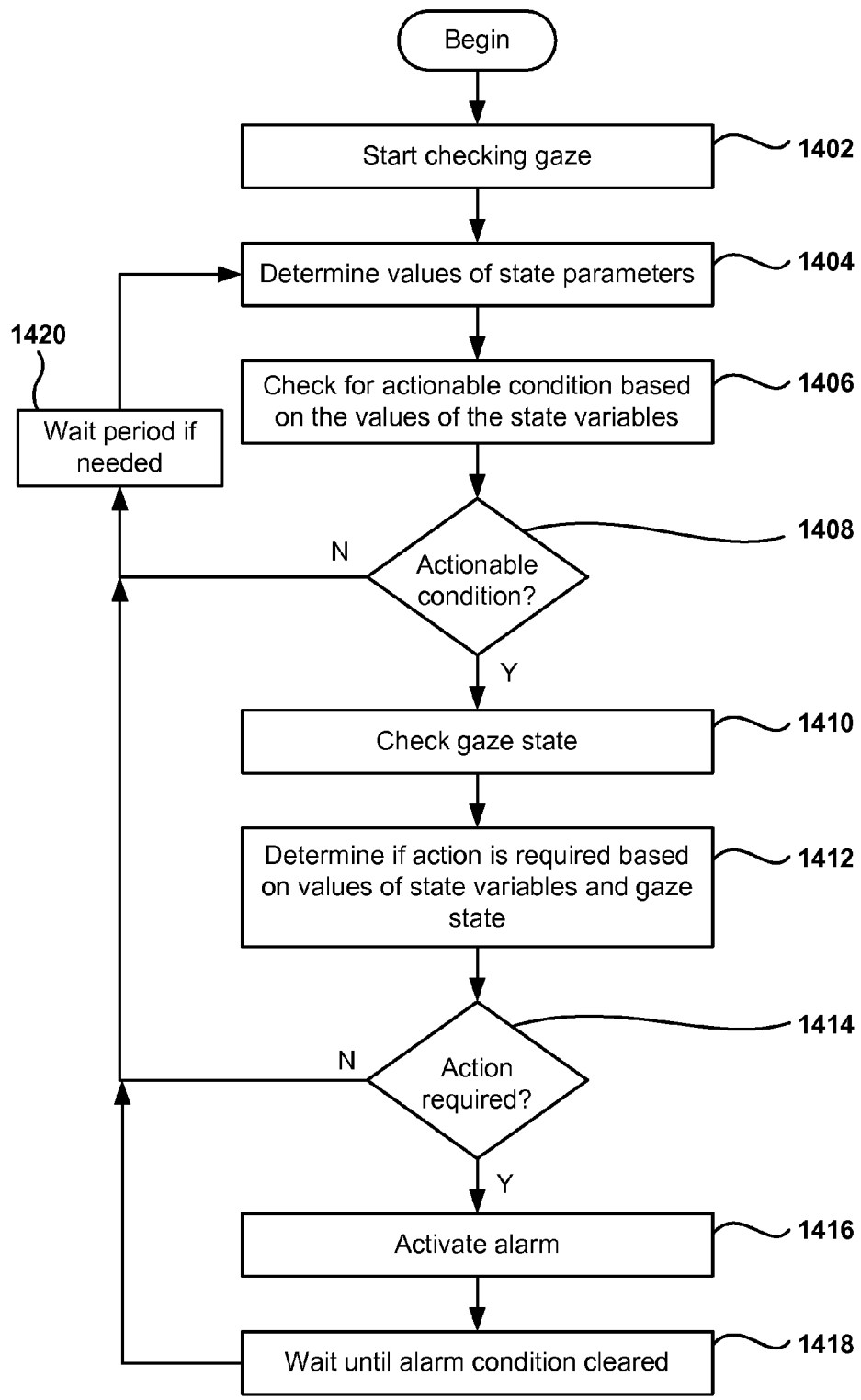
FIG. 14A shows the flow of an algorithm for controlling behavior of an electronic device, and for generating alarms, in accordance with one embodiment of the invention.

FIG. 14A shows the flow of an algorithm for controlling behavior of an electronic device, and for generating alarms, in accordance with one embodiment of the invention. In operation 1402, gaze checking is started, and in operation 1404, the values of state parameters are determined. The state parameters define the state of the device or of some condition in the environment related to the device. After operation 1404, the method proceeds to operation 1406 to check for the existence of an actionable condition based on the values of the state variables. In operation 1408, the result of the check determines if the method proceeds to operation 1410 when there is an actionable condition, or if the method proceeds to operation 1420 if there is no actionable condition. In operation 1420, the method waits for a period of time, as necessary. In one embodiment, the wait period is zero, while in another embodiment, the method waits for a period of time, such as 100 ms, 1 second, 1 minute, etc., before returning to operation 1404 and repeating as described above.

In operation 1410, the gaze state is checked, and in operation 1412, the method operation determines if taking action is required based on the values of the state variables and the gaze state. For example, if the gaze state is "driver not looking ahead" and the state variable indicates that a collision with the car ahead will occur within 2 seconds, then a determination is made to warn the user.

In operation 1414, a check is made to determine if the action is required, and if the action is required, the method flows to operation 1416, where an alarm is activated. If the action is not required, the method proceeds back to operation 1420. After operation 1416, the method proceeds to operation 1418 to wait until the alarm condition is cleared. For example, the alarm condition can be cleared when it is detected that the driver is looking ahead or when the potential-collision condition is cleared.

Figure 14B:
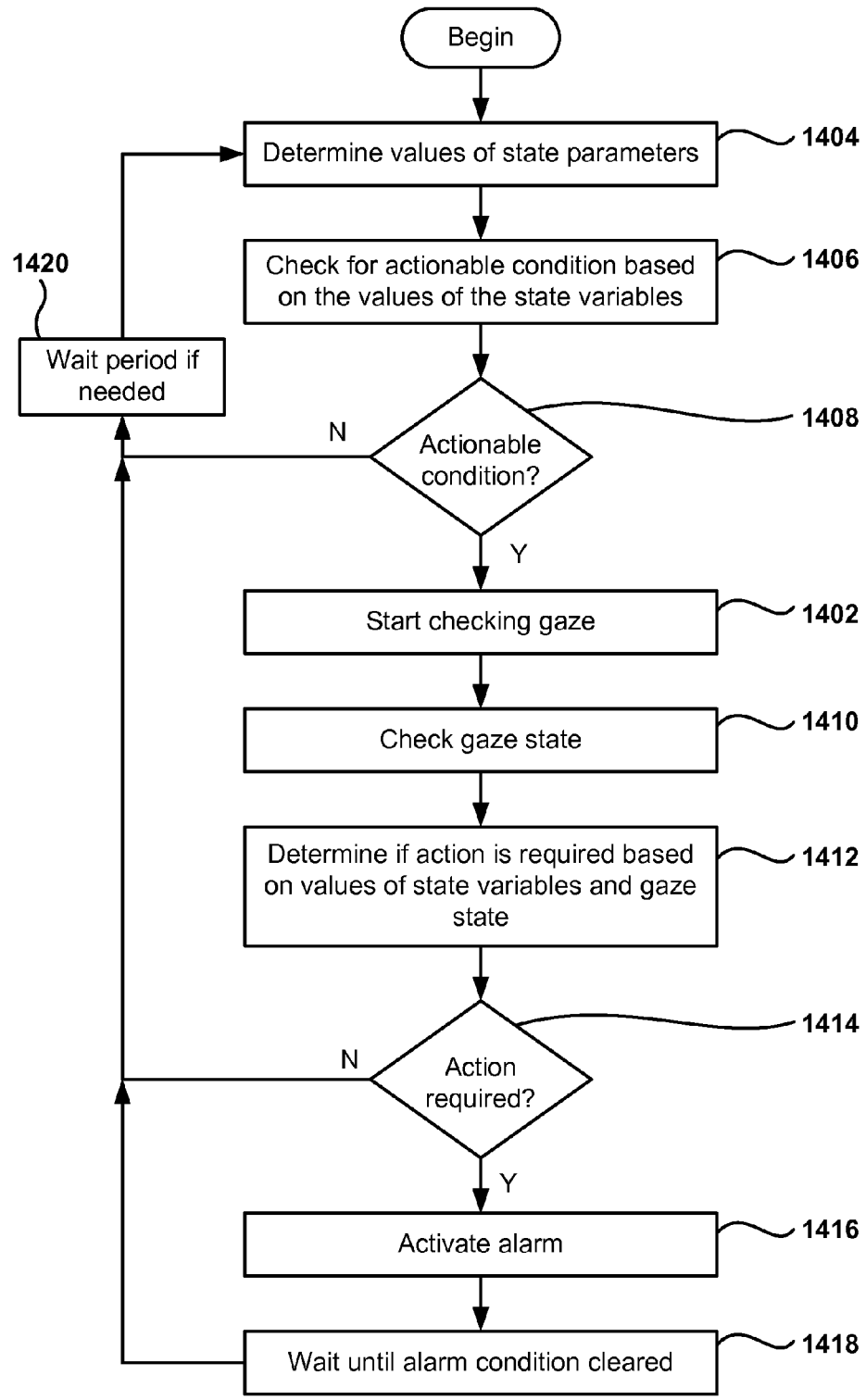
FIG. 14B shows the flow of an alternate algorithm for controlling behavior of an electronic device, and for generating alarms, in accordance with one embodiment of the invention.

FIG. 14B shows the flow of an alternate algorithm for controlling behavior of an electronic device, and for generating alarms, in accordance with one embodiment of the invention. In the embodiment of FIG. 14B, the gaze is not checked continuously, and the gaze is only checked when an actionable condition is detected.

Thus, in operation in operation 1404, the values of state parameters are determined, and the method proceeds to operation 1406 to check for the existence of an actionable condition based on the values of the state variables. In operation 1408, the result of the check determines if the method proceeds to operation 1402 when there is an actionable condition, or if the method proceeds to operation 1420 if there is no actionable condition. In operation 1420, the method waits for a period of time, as necessary. In one embodiment, the wait period is zero, while in another embodiment, the method waits for a period of time, such as 100 ms, 1 second, 1 minute, etc., before returning to operation 1404 and repeat as described above.

In operation 1402, gaze checking is started, and the method proceeds to operation 1410, where the gaze state is checked. In operation 1412, the method operation determines if taking action is required based on the values of the state variables and the gaze state.

In operation 1414, a check is made to determine if the action is required, and if the action is required, the method flows to operation 1416, where an alarm is activated. If the action is not required, the method proceeds back to operation 1420. After operation 1416, the method proceeds to operation 1418 to wait until the alarm condition is cleared. For example, the alarm condition can be cleared when it is detected that the driver is looking ahead or when the potential-collision condition is cleared.

Figure 15A:
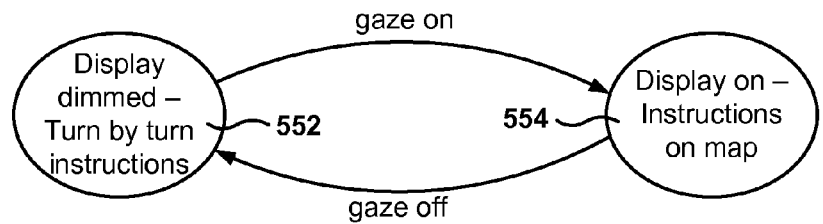
FIGS. 15A to 15C illustrate different state diagrams for embodiments of the invention.
Figure 15B:
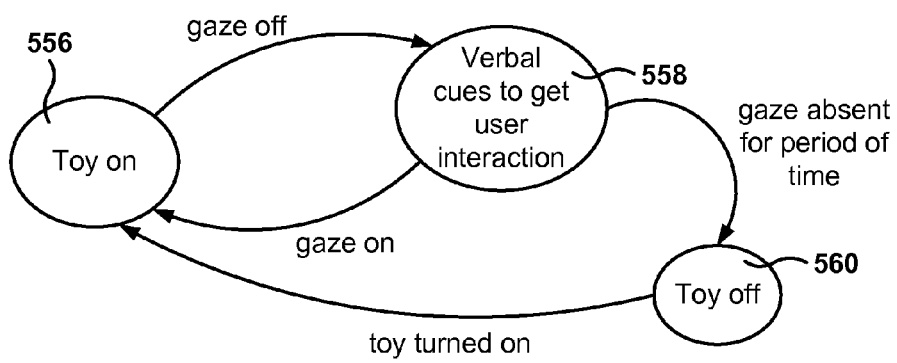
Figure 15C:
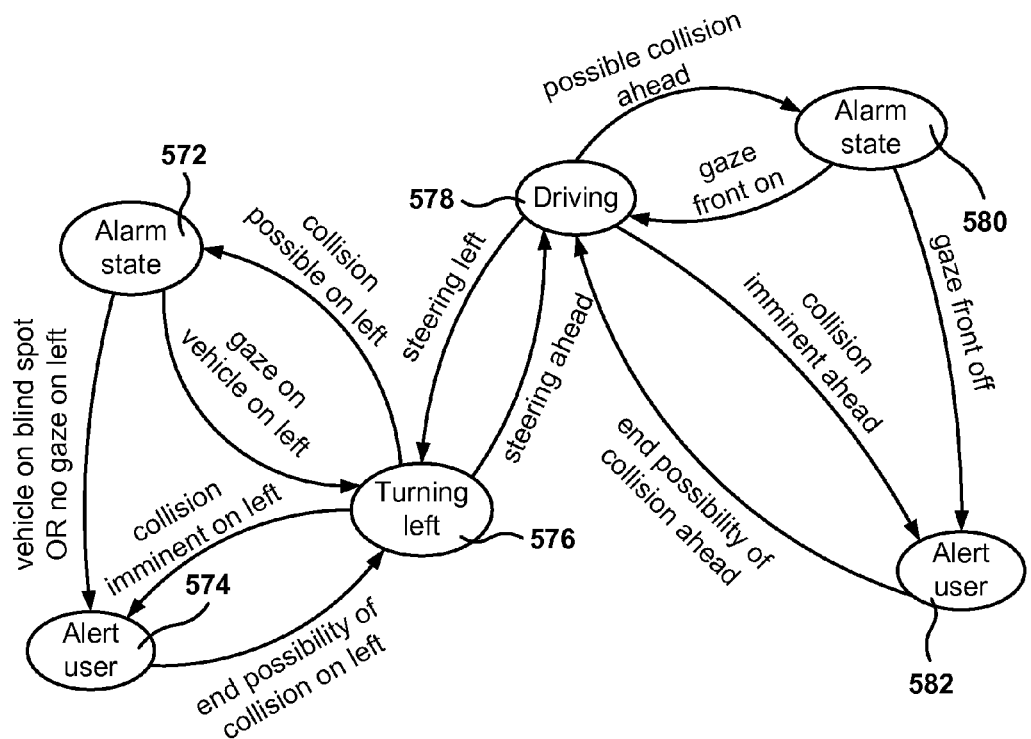

FIGS. 15A to 15C illustrate different state diagrams for embodiments of the invention. FIG. 15A shows a state diagram of a gaze detection application that changes behavior based on the state of the user's gaze. In state 552, the gaze of the user is off the dashboard display. The display on the car's dashboard is dimmed, and the navigation system provides verbal turn-by-turn instructions to the user.

In state 554, the gaze of the user is on the display. Therefore, the dashboard display is on, with high intensity, and the driving directions are provided on a map in the dashboard display. "Gaze on" is referred to herein as the condition where the gaze of the user is set on the target of the gaze detection system, and the "gaze off" is the condition when the gaze of the user is not set on the target of the gaze detection system.

The transitions between state 552 and 554 are triggered by the change in gaze state. When the state machine is in state 552 and the gaze state changes to on, the state machine transitions from state 552 to state 554, and when the state machine is in state 554 and the gaze state changes to off, the state machine transitions from state 554 to state 552.

FIG. 15B presents the state machine for an interactive toy with gaze detection. The state machine includes three states: state 556 where the toy is on, state 560 where the toy is off, and state 558 where the toy provides verbal cues to the user and gets their attention (see example described above for interactive toy).

While in state 556, if the gaze state switches to off, the state machine transitions to state 558. If the gaze state changes to back to "on" while in state 558, the state machine then returns to state 556. However, while in state 558, if the gaze of the child is not detected for a threshold period of time, the state machine transitions to state 560, where the toy is turned off. Finally, a transition will take place from state 560 to state 556 when the toy is turned on.

It should be noted that the embodiments illustrated in FIGS. 15A to 15C are exemplary. The state diagrams are simplified forms of state diagrams that may include more states to perform a variety of functions, where at least one function is based on gaze detection state. Other embodiments may combine gaze with other parameters to determine the state of the device, or to determine the state transitions. The embodiments illustrated herein should therefore not be interpreted to be exclusive or limiting, but rather exemplary or illustrative.

FIG. 15C presents a state diagram of a collision detection application that uses gaze detection. In state 578, the driver is driving and no alarm condition is present. States 580 and 572 are alarm states, that is, states where an event causes the system to evaluate a possible alert condition to be presented to the driver. States 582 and 574 are states where an alert is presented to the user, and state 576 is a state where the system detects that the driver is turning left. As previously described, the state diagram is a simplified diagram. Another embodiment of a state machine may include other states, such as turning right, backing up, etc.

While in state 578, if a possible collision is detected, the state machine transitions to state 580. The possible collision is detected when the car is approaching a car in front, but there is still enough time for the driver to react and avoid the collision. However, while in state 578, if a collision is imminent, the state machine transitions to state 582, where the user is alerted. The transition is made, independent of the state of gaze, because the criticality of alerting the driver, even if the driver is looking ahead, as the driver may be distracted, looking at a street sign, etc.

There are two possible transitions from state 580: if gaze state is "off" the state machine transitions to state 582, and if the gaze state is "on" the state machine transitions so state 578, because the system assumes that the driver is aware of the condition and the alert is not needed. This way, the system avoids producing too many alerts when the user is already in a situation where the collision can be avoided.

From state 582, the state machine transitions back to state 578 when the end of the possible-collision-ahead state is detected. This condition takes place when the distance from the car in front is increased, or when a collision is detected, making the alert unnecessary.

On the left side of FIG. 15C, the state machine includes states related to collision detection while making a left turn. Thus, a state transition takes place from state 578 to state 576 when the system detects that the car is steering left. The left turn can take place because the driver is making a left turn onto another street, or because the driver is changing lanes to the lane on the left. While in state 576, if the system detects the car is steering ahead, then the state machine transitions back to driving state 578. While in state 576, the state machine can also transition to states 572 or state 574. A transition is made to state 572 when a possible collision is detected on the left. This may be, for example, when there is a car on the left lane, or when there is traffic travelling in the opposite direction that will cause a collision. A transition is made to state 574 from state 576, when the system detects that a collision on the left is imminent.

From state 572, the state machine transitions to state 576 when the system detects that the driver has their gaze on the vehicle on the left, and to state 574 when a vehicle is detected on the blind spot of the driver or when the gaze of the driver is not directed to the left. From state 574, the state machine transitions to state 576 when the end of the possibility of collision on the left is determined.

Figure 16:
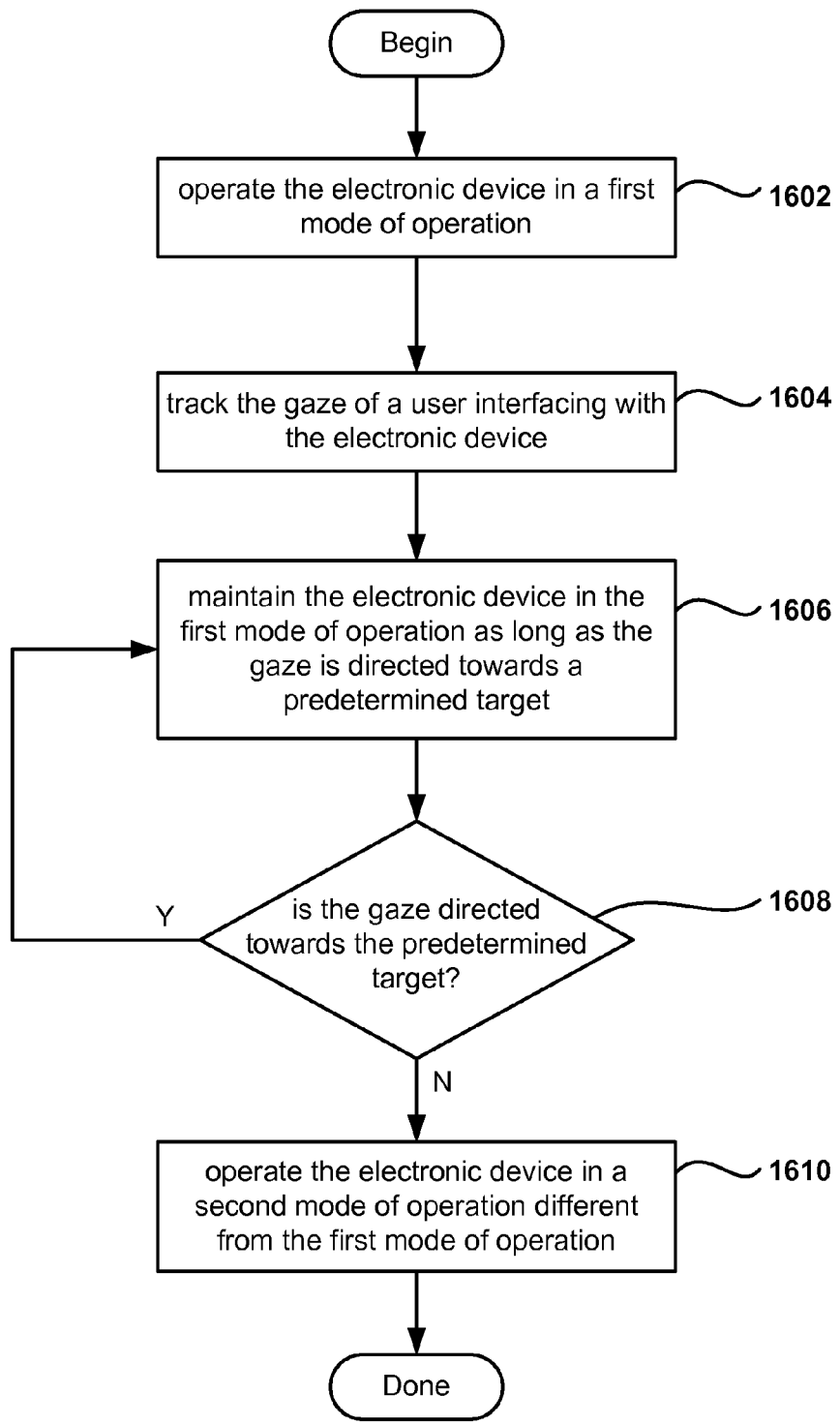
FIG. 16 is a process flowchart for controlling the behavior of an electronic device, in accordance with one embodiment of the invention.

FIG. 16 is a process flowchart for controlling the behavior of an electronic device, in accordance with one embodiment of the invention. In operation 1602, the electronic device is operated in a first mode of operation. Further, in operation 1604, the gaze of the user interfacing with the electronic device is tracked. From operation 1604 the method proceeds to operation 1606, where the electronic device maintains the first mode of operation as long as the gaze of the user is directed towards a predetermined target.

In operation 1608, a check is made to determine is the gaze of the user is directed towards the predetermined target. If the gaze is towards the predetermined target, the method proceeds back to operation 1606, and if the gaze is not directed towards the predetermined target, then method proceeds to operation 1610. The electronic device is operated, in operation 1610, in a second mode of operation different from the first mode of operation. Thus, the electronic device changes to a different mode of operation when the gaze of the user moves away from the predetermined target.

Figure 17:
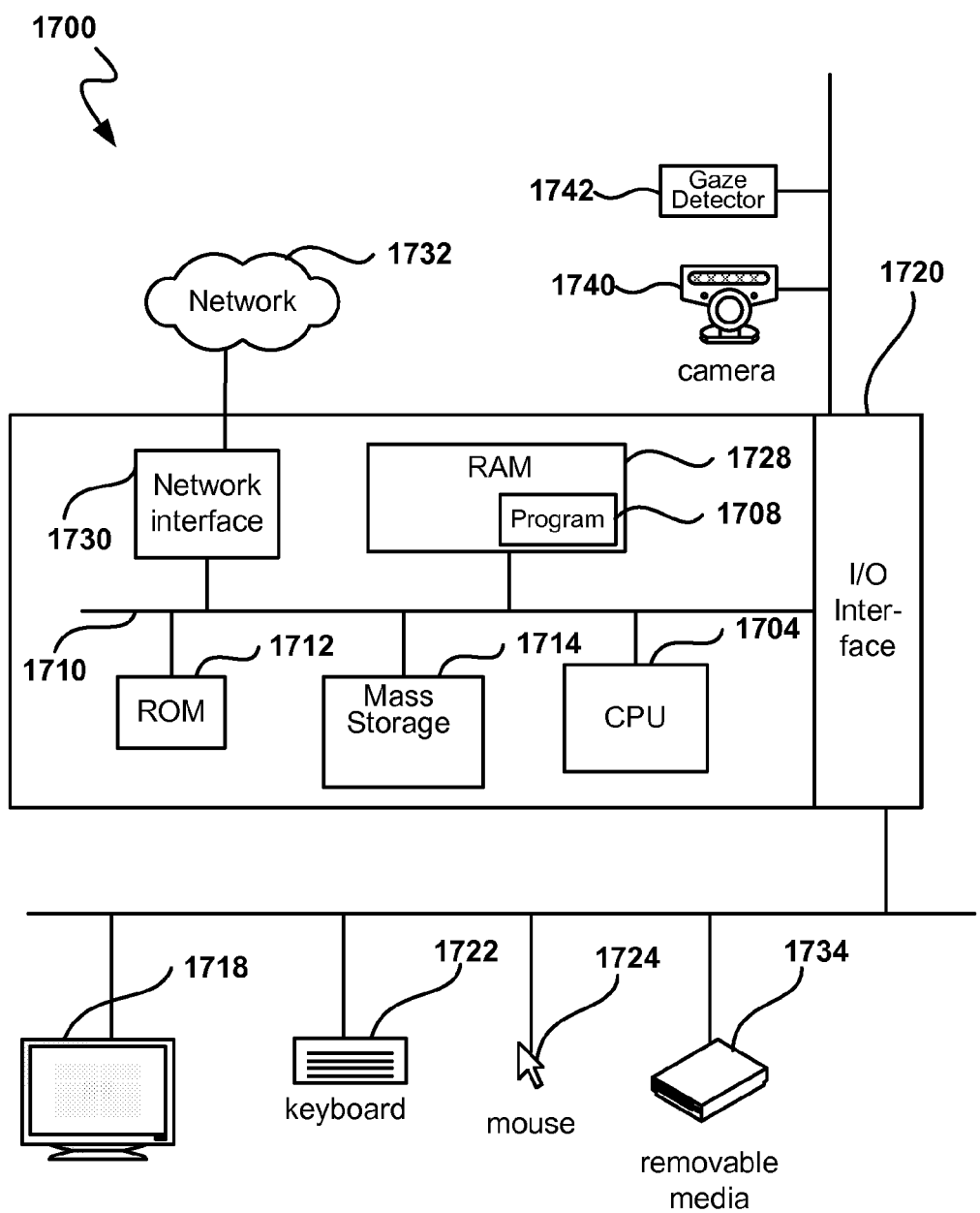
FIG. 17 is a simplified schematic diagram of a computer system for implementing embodiments of the present invention.

FIG. 17 is a simplified schematic diagram of an exemplary computer system for implementing embodiments of the present invention. It should be appreciated that the methods described herein may be performed with a digital processing system, such as a conventional, general-purpose computer system. Special purpose computers, which are designed or programmed to perform only one function, may be used in the alternative. The computer system includes a central processing unit (CPU) 1704, which is coupled through bus 1710 to random access memory (RAM) 1728, read-only memory (ROM) 1712, and mass storage device 1714. Gaze computer program 1708 resides in random access memory (RAM) 1728, but can also reside in mass storage 1714 or ROM 1712.

Mass storage device 1714 represents a persistent data storage device such as a floppy disc drive or a fixed disc drive, which may be local or remote. Network interface 1730 provides connections via network 1732, allowing communications with other devices. It should be appreciated that CPU 1704 may be embodied in a general-purpose processor, a special purpose processor, or a specially programmed logic device. Input/Output (I/O) interface provides communication with different peripherals and is connected with CPU 1704, RAM 1728, ROM 1712, and mass storage device 1714, through bus 1710. Sample peripherals include display 1718, keyboard 1722, cursor control 1724, removable media device 1734, camera 1740, gaze detector 1742, etc.

Display 1718 is configured to display the user interfaces described herein. Keyboard 1722, cursor control 1724, removable media device 1734, and other peripherals are coupled to I/O interface 1720 in order to communicate information in command selections to CPU 1704. It should be appreciated that data to and from external devices may be communicated through I/O interface 1720. The invention can also be practiced in distributed computing environments where tasks are performed by remote processing devices that are linked through a wire-based or wireless network.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

One or more embodiments of the present invention can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for controlling behavior of an electronic device, the method comprising:
    operating the electronic device to present on a display a picture-in-picture display, the display having a first area and a second area, wherein a First video is presented in the first area of the display and a second video is presented in the second area of the display for the picture-in-picture display, the first video is associated with a first audio component and the second video is associated with a second audio component, the first audio component is presented:
    tracking a gaze of a user interfacing with the electronic device;
    maintaining the presenting of the first video in the first area the second video in the second area, and the first audio component while the gaze is directed to the first area of the display, but away from the second area of the display;
    detecting that the gaze is directed towards the second area of the display for a predetermined amount of time;
    switching, in response to the detecting that the gaze is directed towards the second area, a placement of the first video and the second video such that the second video is displayed in the first area and the first video is displayed in the second area; and
    presenting the second audio component associated with the second video and muting the
first audio component associated with the first video in response to the detecting that the gaze is directed toward the second area.

2. The method as recited in claim 1, further including: changing a mode of operation when the gaze of the user is directed away from the
display, wherein the changing the mode of operation includes one or more of pausing the first video, recording the first video, raising or lowering a volume of the first video, and turning off the electronic device.

3. The method as recited in claim 1, wherein tracking the gaze of the user further includes:
    checking a direction of the gaze of the user periodically.

4. The method as recited in claim 3, wherein detecting the gaze further includes:
    determining that the gaze is directed towards the second area when the gaze is directed towards the second area for a plurality of consecutive periods of checking the direction of the gaze.

5. The method as recited in claim 1, further including:
    powering off the electronic device after detecting the gaze is away from the display for a predetermined amount of time.

6. The method as recited in claim 5, further including: suspending the electronic device alter detecting the gaze is away from the display for a predetermined amount of time.

7. The method as recited in claim 1, wherein tracking the gaze of the user includes operating a plurality of gaze detecting units.

8. An electronic device, comprising:
    a display with picture-in-picture display for showing a first video in a first area of the display and a second video is presented in a second area of the display for the picture-in-picture display, wherein the first video is associated with a first audio component and the second video is associated with a second audio component;
    a plurality of gaze detection modules, wherein information from the plurality of gaze detection modules is combined to determine a direction of a gaze of a user interfacing with the display;
    a processor that detects if the direction of the gaze is directed towards the first area or the second area, wherein the processor switches a placement of the first video and the second video when the processor detects that the gaze is directed towards the second area for a predetermined amount of time, such that the first video is shown in the second area of the display and the second video is shown in the first area of the display; and
    wherein the first audio component is presented and the second audio component is muted when the first video is shown in the first area of the display and wherein the second audio component is presented and the first audio component is muted when the second video is shown in the first area of the display.

9. The method as recited in claim 1, wherein the switching the placement of the first video and the second video further includes:
prompting the user for authorization to switch the placement of the first video and the second video when the gaze is detected to be directed towards the second area of the display; and switching the placement of the first video and the second video based on a response from the user to the prompting.

10. The electronic device of claim 8, wherein the processor is configured to change a mode of operation when the gaze of the user is directed away from the display, wherein the changing the mode of operation includes one or more of pausing the first video, recording the First video, raising or lowering a volume of the first video, and turning off the electronic device.

11. The electronic device of claim 8, wherein the processor is configured to check the direction of the gaze of the user periodically.

12. The electronic device of claim 11, wherein the processor is further configured for determining that the gaze is directed towards the second area when the gaze is directed towards the second area for a plurality of consecutive periods of checking the direction of the gaze.

13. The electronic device of claim 8, wherein the processor is further configured to power off the electronic device after detecting the gaze is away from the display for a predetermined amount of time.

14. The electronic device of claim 8, wherein the processor is further configured to suspend the electronic device after detecting the gaze is away from the display for a predetermined amount of time.

15. The electronic device of claim 8, further comprising: a plurality of gaze detection units for tracking the direction of the gaze.

* * * * *